(12) United States Patent
Nakao et al.

(10) Patent No.: US 6,246,568 B1
(45) Date of Patent: Jun. 12, 2001

(54) ELECTRIC DOUBLE-LAYER CAPACITOR AND METHOD FOR MANUFACTURING THE SAME

(75) Inventors: Keiichi Nakao, Hirakata; Kyoushige Shimizu; Takumi Yamaguchi, both of Neyagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/147,558

(22) PCT Filed: Jun. 12, 1998

(86) PCT No.: PCT/JP98/02603

§ 371 Date: Jan. 20, 1999

§ 102(e) Date: Jan. 20, 1999

(87) PCT Pub. No.: WO98/58397

PCT Pub. Date: Dec. 23, 1998

(30) Foreign Application Priority Data

Jun. 16, 1997 (JP) .................................................... 9-158376
Jul. 28, 1997 (JP) .................................................... 9-201257
Jan. 22, 1998 (JP) ................................................... 10-010210

(51) Int. Cl.[7] .................................................. H01G 9/00
(52) U.S. Cl. ......................... 361/502; 361/503; 29/25.03
(58) Field of Search ................................. 361/502, 503, 361/504, 505, 506; 29/25.03

(56) References Cited

U.S. PATENT DOCUMENTS

| | | | | |
|---|---|---|---|---|
| 4,408,259 | * | 10/1983 | Muranaka et al. | 361/502 |
| 4,488,203 | * | 12/1984 | Muranaka et al. | 361/502 |
| 5,150,283 | * | 9/1992 | Yoshida et al. | 361/502 |
| 5,545,933 | * | 8/1996 | Okamura et al. | 307/109 |
| 5,557,497 | * | 9/1996 | Ivanou et al. | 361/502 |
| 5,682,288 | * | 10/1997 | Wani | 361/502 |
| 5,953,204 | * | 9/1999 | Suhara et al. | 361/502 |
| 6,005,765 | * | 12/1999 | Maeda et al. | 361/502 |
| 6,038,123 | * | 3/2000 | Shimodaira et al. | 361/502 |

FOREIGN PATENT DOCUMENTS

| | | |
|---|---|---|
| 57-60828 | 4/1982 | (JP) . |
| 57-84120 | 5/1982 | (JP) . |
| 62-16506 | 1/1987 | (JP) . |
| 62-179711 | 8/1987 | (JP) . |
| 63-104316 | 5/1988 | (JP) . |
| 63-190318 | 8/1988 | (JP) . |
| 63-196028 | 8/1988 | (JP) . |
| 63-316422 | 12/1988 | (JP) . |
| 1-164017 | 6/1989 | (JP) . |
| 1-227417 | 9/1989 | (JP) . |
| 3-280518 | 12/1991 | (JP) . |
| 4-65814 | 3/1992 | (JP) . |
| 4-88619 | 3/1992 | (JP) . |
| 06203849 | 7/1994 | (JP) . |
| 06316784 | 11/1994 | (JP) . |
| 07331201 | 12/1995 | (JP) . |
| 08203536 | 8/1996 | (JP) . |
| 08250380 | * 9/1996 | (JP) .............................. H01G/9/058 |

* cited by examiner

Primary Examiner—Dean A. Reichard
Assistant Examiner—Eric Thomas
(74) Attorney, Agent, or Firm—McDermott, Will & Emery

(57) ABSTRACT

The invention relates to an electric double layer capacitor for large capacity used in regeneration or electric power storage for various electric appliances and electric vehicles, and its manufacturing method. As the resin to be used in the current collector, by adding low softening point resin, polytetrafluoroethylene resin, latex resin or the like, the flexibility, thick coating performance and winding performance are improved. By preparing the electrode solution for making such current collector by using a high pressure dispersion machine, the capacity and density of the current collector can be enhanced substantially. According to this manufacturing method, the electric double layer capacitor may be further increased in size, increased in capacity and lowered in cost.

53 Claims, 5 Drawing Sheets

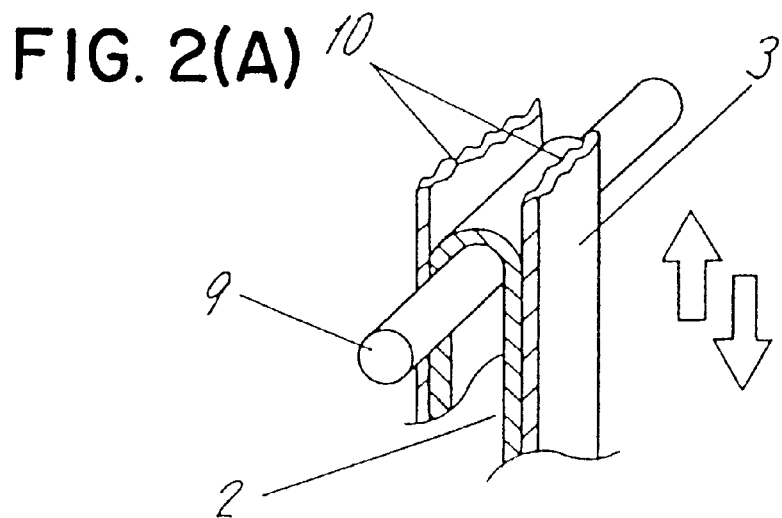
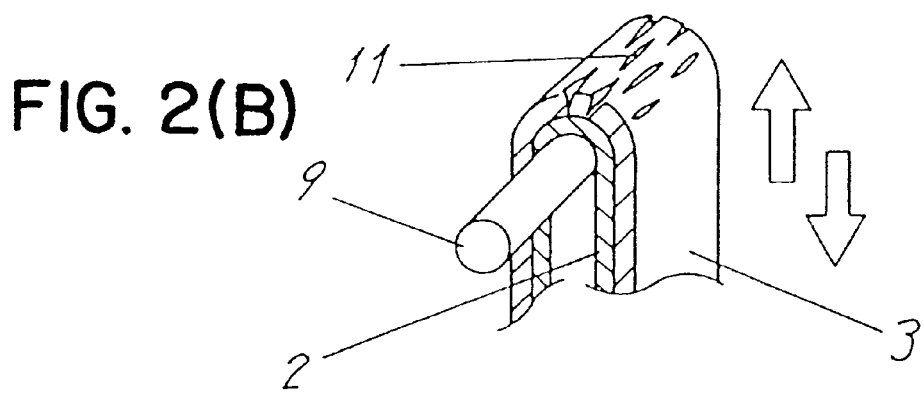
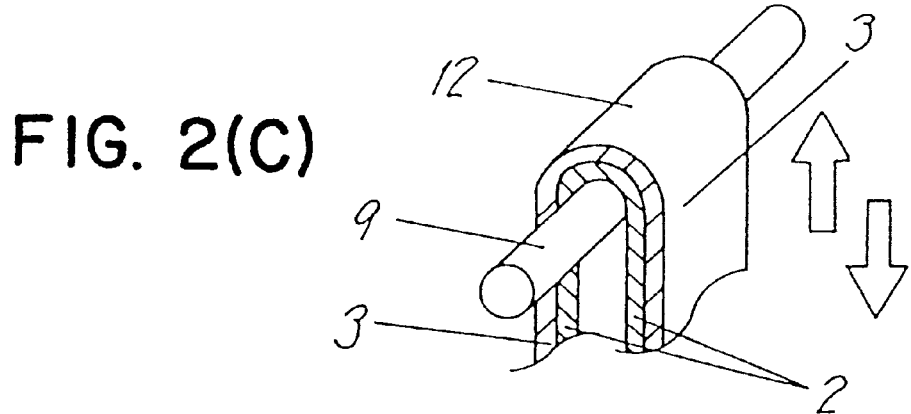

ELECTRIC DOUBLE-LAYER CAPACITOR AND METHOD FOR MANUFACTURING THE SAME

This application is a 371 of PCT/JP98/02603 filed Jun. 12, 1998.

TECHNICAL FIELD

The present invention relates to an electric double layer capacitor for large capacity used for regeneration or electric power storage for various electric appliances and electric vehicles, and its manufacturing method.

BACKGROUND ART

An electric double layer capacitor is constituted by winding or laminating a plurality of conductive foils of aluminum or the like forming a current collector on a separator, and sealing in a case together with a nonaqueous electrolyte solution. This electric double layer capacitor is, recently, expanding its applications in regeneration or electric power storage for various electric appliances and electric vehicles. Accordingly, the electric double layer capacitor is further demanded to be higher in performance, larger in capacity, superior in reliability, and lower in cost.

In the hitherto proposed electric double layer capacitor, as disclosed in Japanese Laid-open Patent No. 1-164017, a binder such as polytetrafluoroethylene (PTFE) is kneaded with activated carbon or carbon to form a current collector. It is, however, difficult to disperse fluorine derivative binder material uniformly in the current collector, and it was another problem to use an exclusive solvent. To solve these problems, in Japanese Laid-open Patent No. 6-316784, the use of ultrasonic homogenizer is proposed as a manufacturing technique of uniform mixed powder of carbon black and PTFE, while Japanese Laid-open Patent No. 6-203849 and Japanese Laid-open Patent No. 8-203536 propose the use of ultrasonic homogenizer as a technique for dispersing catalyst and nickel together with carbon black in the fuel electrode of fuel cell, its catalyst manufacturing method, and battery operating method. In such methods, however, there was a limit in enhancement of dispersion.

Incidentally, Japanese Laid-open Patent No. 63-104316 proposes the use of elastomer of which glass transition temperature is −10 deg. C. or less as the current collector. As examples of the elastomer, binders are proposed such as NBR, SBR, fluororubber, and silicone rubber. Also proposed is a method of dissolving such binder in an organic solvent, mixing Ketienblack therein to disperse the two, evaporating the solvent, and forming by blending with a roll. It is further proposed to wind an elastomer around a roll, add Ketienblack, mix, blend, and form simultaneously. Such techniques are same as the conventional methods used in manufacture of tires and other rubber kneaded products, and it is difficult to manufacture current collectors of high capacity such as lithium secondary battery and lead secondary battery by such methods. As a similar example, Japanese Laid-open Patent No. 7-331201 proposes to knead rubber material as a binder of expanded graphite. In this case, the rubber material is dissolved in a solvent such as toluene, and carbon powder is added and kneaded, and heated. In a method proposed in Japanese Laid-open Patent No. 8-250380, meanwhile, powder of acrylonitrile-butadiene rubber is dissolved in a solvent such as xylene, and mixed with activated carbon powder and acetylene black, and finally the solvent is evaporated, and the obtained mixture is formed in a thickness of 50 to 500 microns by pressure forming method or by using extrusion forming die. In such conventional dissolving methods, since the rubber material is completely dissolved (in other words, dissolved or dispersed to a molecular state of several angstroms), and also pores for forming the electric double layer of several angstroms on the surface of activated carbon are clogged, it was a problem that the product capacity was lowered significantly. To solve such conventional problems, methods of kneading rubber and activated carbon or forming the current collector have been proposed, but there were limits.

Meanwhile, as proposed in Japanese Laid-open Patent No. 62-16506 or Japanese Laid-open Patent No. 62-179711, activated carbon powder is dispersed in latex using water as dispersant, the mixed solution is dehydrated to remove solvent such as dispersant, the selected aggregated matter is dried, this aggregated matter is crushed, granulated, and finally pressurized, and a disk-shaped current collector of 16 mm in diameter and 0.9 mm in thickness is formed. In this case, however, it takes cost in drying and crushing.

On the other hand, as proposed in Japanese Laid-open Patent No. 3-280518, ammonium salt of carboxyethyl cellulose or the like is dissolved in water, and activated carbon is mixed and dispersed, and the prepared solution is applied on an aluminum base material by a technique such as roll coating or doctor blade coating to manufacture an electric double layer capacitor. Besides, Japanese Laid-open Patent No. 57-60828 proposes to enhance the coat film density by a press, but since the current collector is stiff and brittle, the coat film density is not enhanced unless pressed at a high pressure. When pressed at a high pressure, however, the electrode coat film may be broken, or may be peeled off from the conductive foil, and further the conductive electrode may be elongated or deformed like seaweed. In this case, by decreasing the resin amount, the pressing pressure may be somewhat lowered, but since the resin amount is small, the binding density of the current collector coat film is insufficient (for example, the adhesion strength of the conductive foil and activated carbon coat film is insufficient, and aggregation breakage occurs in the activated carbon coat film itself). Therefore, it was a problem that the current collector was broken or peeled off when winding or laminating.

DISCLOSURE OF THE INVENTION

The invention is to solve such problems of the prior arts, and presents an electric double layer capacitor capable of further increasing the capacity, increasing the size, reducing the thickness, and lowering the cost, and its manufacturing method.

To achieve the object, in the electric double layer capacitor and its manufacturing method of the invention, a current collector formed by dispersing activated carbon, conductive agent, ethylene tetrafluoride resin, and at least one kind selected from the group consisting of ammonium salt of carboxy methyl cellulose resin, polyvinyl alcohol, methyl cellulose and hydroxy propyl cellulose resin is formed at least on one flat surface of the conductive film at a density of 0.35 g/cc or more to 1.50 g/cc or less, and a plurality of the conductive foils are wound or laminated on a separator, and sealed in a nonaqueous electrolyte solution together with lead-out electrodes.

In this constitution, as compared with the conventional electric double layer capacitor of- coil type or the like with the height of several centimeters or less, by using such new current collector, it is possible to further increase in size, increase in capacity, and decrease in cost.

Also according to the manufacturing method, the current collector itself may be applicable to flexibility, filling density, binding force, winding performance, and thick coating, and also reduction of equivalent series resistance and reduction of impedance. As a result, the performance of the electric double layer capacitor using this current collector may be further enhanced.

BRIEF DESCRIPTION OF THE DRAWINGS

FIG. 2 is a perspective view for explaining a mode of evaluation of winding performance of current collector and conductive foil.

BEST MODE OF CARRYING OUT THE INVENTION

Embodiment 1

Figure 1:
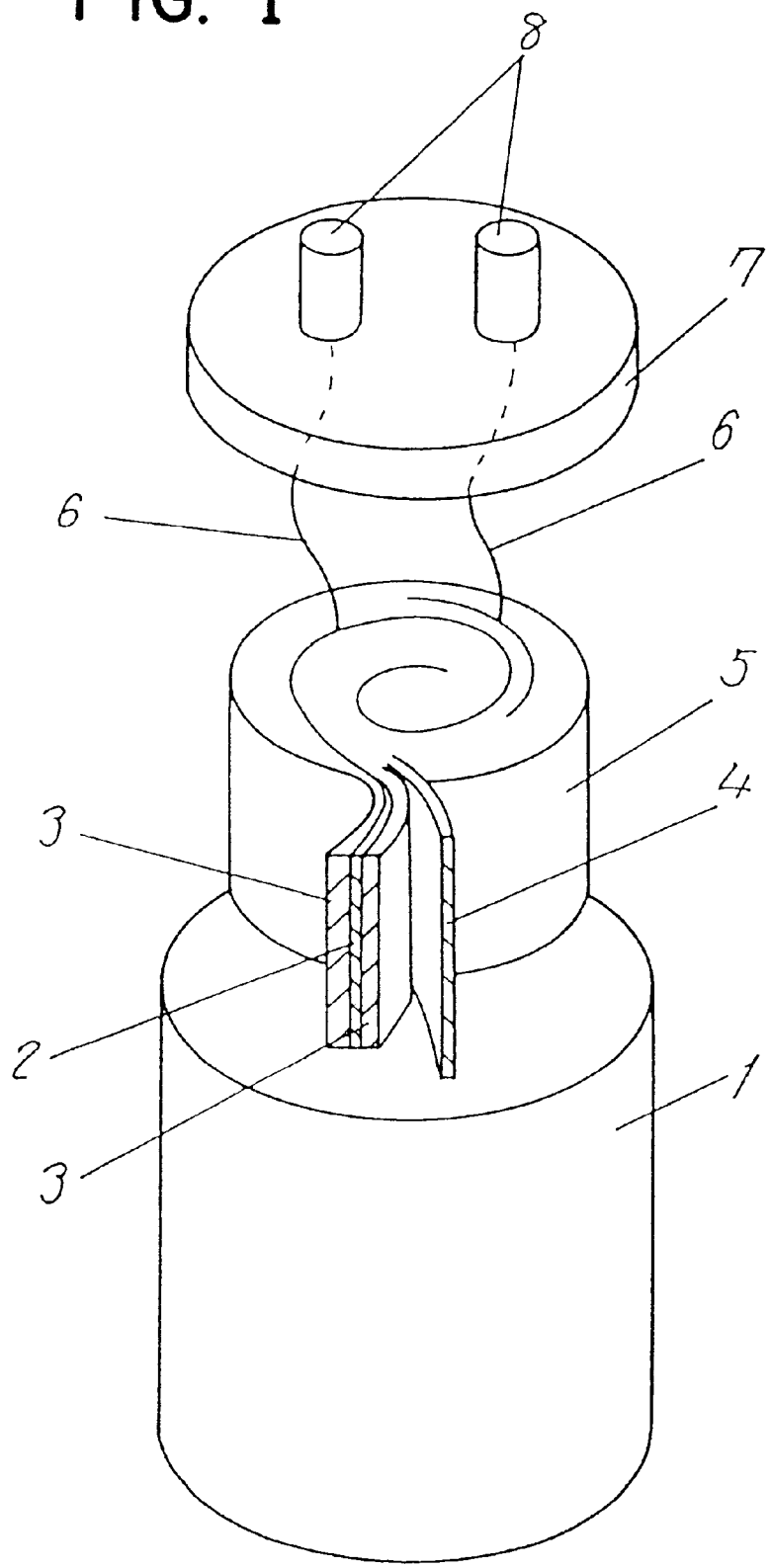
FIG. 1 is a block diagram of a winding type electric double layer capacitor in an embodiment of the invention.

FIG. 1 is a block diagram of a winding type electric double layer capacitor in an embodiment of the invention. In FIG. 1, reference numeral 1 is a case, in this case, on the surface of a conductive foil 2, a current collector 3 formed by dispersing at least one of ammonium salt of carboxy methyl cellulose resin, polyvinyl alcohol, methyl cellulose, and hydroxy propyl cellulose resin, together with polytetrafluoroethylene resin (PTFE) is formed, as a feature of the invention, at least on one plane of the conductive foil 2 by binding at density of 0.35 g/cc or more to 1.50 g/cc or less. A plurality of conductive foils, that are conductors, forming this current collector 3 are wound on a separator 4, and a winding 5a is formed. A plurality of lead-out electrodes 6 are connected to the plurality of conductive foils 2 forming this winding 5a, and connected to a terminal 8 through a sealing material 7. In the actual electric double layer capacitor, the winding 5a is sealed in the case 1 together with electrolyte solution.

A further detail is described below. In 500 parts by weight of purified water, 6 parts by weight of polytetrafluoroethylene resin (as dry weight of emulsion with solid content of 50%), and 6 parts by weight of carboxy methyl cellulose are dissolved, and 100 parts by weight of activated carbon powder and 10 parts by weight of acetylene black are added, and dispersed uniformly. Thus, an electrode solution was prepared. By chemical etching, the electrode solution was applied on both sides of a conductive film (100 mm in width, 20 m in length) by using a coating machine, and a coat film of 80 microns in thickness on one side was formed. Thus, a current collector was prepared.

A lead-out electrode was connected to the obtained foil of electrode coat film, and a specified length was wound on a separator, and put in an aluminum case. As the electrolyte solution, 1 mol/liter of tetraethyl ammonium tetrafluoroborate -was dissolved in propylene carbonate solution. This electrolyte solution was input in the aluminum case, and the current collector was wetted. While disposing a part of the lead-out electrode, it was sealed by using a rubber packing. In this way, an electric double layer capacitor was prepared (hereinafter called invention 1).

By way of comparison, as a first, prior art, using carboxy methyl cellulose, 6 parts by weight is dissolved in 500 parts by weight of purified water, and 100 parts by weight of activated carbon powder and 10 parts by weight of acetylene black are added, and dispersed uniformly, in an attempt to prepare an electrode solution. However, activated carbon, or in particular acetylene black could not be dispersed in the purified water. Accordingly, 300 parts by weight of ethyl alcohol was added and dispersed (aside from alcohol, when ammonia was added, a similar effect was obtained). This electrode solution (hereinafter called conventional electrode solution) was applied on both sides of the conductive film same as in the embodiment, and dried, and a coat film of 80 microns in thickness on one side was formed. Further, it was dried with far infrared rays for 120 minutes at 110 deg. C. This foil of electrode coat film was wound on a separator by the same length (same area) as in the embodiment, and an electric double layer capacitor was prepared (hereinafter called prior art 1).

For further comparison, as a second prior art, an electrode solution was prepared by using polytetrafluoroethylene resin only, and it was applied on both sides of a conductive foil same as in the embodiment, and an electric double layer capacitor was prepared (hereinafter called prior art 2).

The invention 1, and prior arts 1 and 2 were presented for acceleration test. As a result, deterioration of characteristic was smaller in invention 1. Accordingly, by redissolving test of various coat films for forming the current collector in nonaqueous electrolyte solution or water, the binding strength was measured before and after it. As a result, in invention 1, there was no abnormality in redissolving test, and the binding strength was not changed before and after redissolving test.

In prior arts 1 and 2, on the other hand, when winding the current collector, coat film crack or coat film peeling occurred. Or when the finished current collector was folded and stretched multiple times, crack or peeling did not took place in invention 1, but crack or peeling was found in prior art 2. In the polytetrafluoroethylene resin alone, there was a problem in forming performance of coat film, and if it is usable in button type or coin type, it is known difficult to apply in winding type or laminate types. As compared with prior arts 1, 2, it was easier to remove moisture in the coat film in invention 1. This is considered because the polytetrafluoroethylene resin itself does not have water absorption or water solubility. By combining such polytetrafluoroethylene resin (the polytetrafluoroethylene resin itself does not have water absorption or water solubility, and has a proper flexibility, but lacks in film forming performance), with other resin material, the physical characteristic of the current collector can be enhanced, and the product reliability is enhanced.

Although the polytetrafluoroethylene resin itself is not soluble in water, but by dispersing preliminarily in water or solvent in a state of emulsion, it is easier to handle or manufacture electrode solution. In the case of such emulsion type polytetrafluoroethylene resin, it is often dispersed in purified water by using surface active agent or the like. Accordingly, depending on the kind of the finished polytetrafluoroethylene resin, the pH varies. When manufacturing an electrode solution of an electric double layer capacitor, a neutral or weak alkaline solution is preferred. Depending on the kind of the activated carbon used in the electric double layer capacitor, a carboxyl group may be left over as a residue to surface chemical substance according to the treatment of activated carbon. Such activated carbon is easily dispersed in a weak alkaline resin solution. However, when the acidity of the resin solution is high, it is hard to disperse the activated carbon uniformly. Therefore, the pH of the disperse solution of polytetrafluoroethylene resin is preferred to be 5 or more to 12 or less.

The content of the polytetrafluoroethylene resin in 100 parts by weight of activated carbon is preferred to be 1 part by weight or more to 20 parts by weight or less as the solid content of polytetrafluoroethylene resin (in dry weight). If less than 0.5 part by weight, the effect of addition is small, and if more than 25 parts by weight, the capacitor capacity of the product may be lost.

Incidentally, by using polytetrafluoroethylene resin in emulsion state, the dispersant in the polytetrafluoroethylene resin can be effectively utilized, and an electrode solution can be prepared without adding environmental loading substance such as alcohol or ammonia. In particular, by using water (or purified water) only as the volatile content in the electrode solution, the working environments including cleaning of equipment can be improved. The particle size of the polytetrafluoroethylene resin is preferred to be 1 micron or less. If larger than 1.5 microns, it is hard to disperse uniformly.

As the resin to be mixed with polytetrafluoroethylene resin, water-soluble high polymer materials for general purpose can be used, such as carboxy methyl cellulose, polyvinyl alcohol, methyl cellulose, and hydroxy propyl cellulose. By mixing the polytetrafluoroethylene resin with such water-soluble high polymer material, both waterproof property and binding performance of coat film are achieved. By adding such resin, moreover, if the thickness is 0.1 mm or less or if the thickness is 1 mm or more, the current collector can be coated freely in a desired thickness depending on the product. The viscosity can be adjusted easily in a range, for example, from 1 poise or more to 200 poise or less. Without adding such resin, the viscosity of the electrode solution is 0.5 poise or less, and the plasticity (thixotropy) is further lowered, and therefore if coated in a thickness of 0.05 mm or less, a thickness of 0.1 mm or more cannot be applied. Other problem is that the same thickness cannot be formed every time. Thus, by using the polytetrafluoroethylene resin together with water-soluble high polymer such as carboxy methyl cellulose, the coat film precision can be enhanced.

In the invention, the density of the current collector is preferred to be 0.35 g/cc or more to 1.50 g/cc or less. If less than 0.30 g/cc, the density of the current collector is low, and crack or other defects hardly occur in the coat film when winding, but when assembled into the product, the capacity is lower. If more than 1.55 g/cc, the nonaqueous electrode solution hardly permeates into the inside of the current collector, and when assembled into the product, the capacity is lowered or the impedance is heightened.

Embodiment 2

FIG. 2 explains a mode of evaluating the winding performance of the current collector and conductive foil. In FIG. 2, in a bound state of the current collector 3 having activated carbon and conductive agent of polytetrafluoroethylene resin and binder resin on the surface of the conductive foil 2, evaluation of winding performance of the current collector 3 and conductive film 2 is explained. In FIG. 2, reference numeral 9 is a round bar. Around the round bar 9, the conductive foil 2 cut in a proper width and binding the current collector 3 at least on one surface is wound, and it is evaluated by squeezing the conductive foil 2 forming the current collector 3 in the direction indicated by arrow with a specific force. By this method of evaluation, the winding performance of the current collector 3 is evaluated (whether applicable in winding type electric double layer capacitor, or whether capable of obtaining deflection resistance required even in laminate type electric double layer capacitor). In FIG. 2 (A), the current collector 3 is peeled off the conductive foil 2, and further the current collector 3 itself forms a fracture 10. In FIG. 2 (B), the current collector 3 is not peeled off the conductive foil 2, and fine cracks 11 are formed on the surface of the current collector 3. Herein, a great difference between the fine cracks 11 and the fracture 10 lies in presence or absence of interface breakage between the current collector 3 and conductive foil 2. In FIG. 2 (C), the conductive film 2 is not peeled off the current collector 3, and a normal surface 12 is formed without fracture or fine cracks 11.

According to this method of evaluation, in embodiment 2, thick coating of the current collector coat film by using polytetrafluoroethylene resin is explained.

First, in 500 parts by weight of purified water, 12 parts by weight of polytetrafluoroethylene resin (using emulsion with solid content of 30%), and resin having part of carboxy methyl cellulose replaced by NH4 ions (hereinafter called CMC-NH4) are dispersed, and further 100 parts by weight of activated carbon powder and 10 parts by weight of acetylene black are added, and dispersed uniformly. Thus, an electrode solution is prepared. This electrode solution was applied on a conductive foil, dried, and an electric double layer capacitor was prepared same as in embodiment 1 (hereinafter called invention 2).

By way of comparison, as a prior art, using carboxy methyl cellulose (partly replaced with NH4 ions), an electric double layer capacitor was prepared (hereinafter called prior art 3).

Finished coat films were compared, and the current collector of invention 2 could be wound in a smaller diameter of 1 mm. On the other hand, in prior art 3, if wound in a smaller diameter than 3 mm, crack or peeling occurred. Accordingly, the length of the current collector that can be wound in the product (aluminum case) is longer in invention 2 as compared with prior art 3, and the product capacity and energy density can be enhanced. Thus, by adding polytetrafluoroethylene resin, the product capacity can be heightened. Besides, in order to enhance the winding performance of prior art 3, in the case of adding a necessary amount of glycerin in the, electrode solution as a water-soluble plasticizer, the winding diameter was as small as 1 mm, but when assembled into the product, to the contrary, the capacity value was lowered.

When polytetrafluoroethylene resin is mixed with a conventional water-soluble resin, the concentration of the prepared electrode solution may vary significantly depending on the kind of the added activated carbon or conductive agent (in particular, by their particle size or specific surface area). Accordingly, the viscosity of the electrode solution is desired to be set in a composition in a range of 1 poise or more to 200 poise or less. If less than 0.5 poise, the viscosity is too low, and it is hard to form a coat film in a thickness of 50 microns or more, and if finished, the thickness difference may be larger than plus or minus 5 microns or more. If the viscosity is more than 300 poise, although a thick film over 50 microns can be easily formed, the leveling (the electrode solution itself flowing so as to eliminate uneven coating by the action of gravity) is poor, and the productivity drops. To manufacture for the application in electric double layer capacitor, the thickness difference of current collector (difference between maximum thickness and minimum thickness) is desired to be 5 microns or less. If exceeding 10 microns, if the current collector of a same length is wound, the diameter of the finished winding may be different.

Accordingly, when applying by using a coating machine (doctor blade coater, etc.), as explained herein, by adding a water-soluble high polymer, the viscosity may be optimized to an easy-to-apply viscosity (preferably about 5 to 100 poise). Moreover, by keeping the thickness difference of the coat film below 5 microns, stabilization of manufacturing process and decrease of fluctuations of products may be realized. Thus, the fluctuations in capacity value among products may be kept to a minimum limit.

Thus, by the resin containing polytetrafluoroethylene resin, by using the activated carbon and conductive agent as the current collector 3, the winding performance can be enhanced. Referring now to FIG. 2, a mode of evaluation of winding performance of the current collector on the conductive foil 2 is described. In FIG. 2, reference numeral 9 is a round bar. Around the round bar 9, by winding the conductive foil 2 cut in the product width and binding the current collector 3 at least on one surface, the winding performance of the current collector 3 is evaluated. In FIG. 2 (A), the current collector 3 is peeled off the conductive foil 2, and further the current collector 3 itself forms a fracture 10, and this state is evaluated as x (winding disabled). In FIG. 2 (B), the current collector 3 is not peeled off the conductive foil 2, and fine cracks 11 are formed on the surface of the current collector 3, and this state is evaluated as Δ (inferior in winding performance). In FIG. 2 (C), the conductive film 2 is not peeled off the current collector 3, and the surface of the current collector 3 is free from fracture, crack or damage, and this state is evaluated o (excellent in winding performance). Herein, the current collector 3 was formed on both sides of the conductive film 2, and both surfaces were evaluated alternately 10 to 100 times each.

By using a hitherto proposed current collector not containing latex, when the thickness is 50 microns, if the winding diameter was 5 mm, the evaluation was FIG. 2 (C), but when the thickness was increased to 80 microns, the winding was sometimes inferior as in FIG. 2 (B). At the thickness of 150 microns or more, if the winding diameter was 5 mm, the winding was sometimes disabled as in FIG. 2 (A). At the thickness of 50 microns, as the winding diameter was decreased to 4 mm, 3 mm, and 2 mm, the phenomenon of inferior winding as in FIG. 2 (B) tended to occur. Concerning such winding performance of the current collector, it is empirically known that it is also influenced by the residual moisture in the current collector coat film. Accordingly, by adjusting the residual moisture in the current collector at 30% or more, occurrence of fine cracks 11 or fracture 10 in winding may be decreased. But it is difficult to control the residual moisture accurately, and it was a problem that there were large effects depending on season and ambient temperature.

On the other hand, in the case of the resin containing polytetrafluoroethylene resin of embodiment 2, if the current collector thickness is increased to 100 microns or 200 microns and the winding diameter is 2 mm or less, fine cracks 11 or fracture 10 did not occur when winding. As a result of similar experiment by varying the residual moisture of the current collector, it was similarly free from fine cracks 11 or fracture 10 at the residual moisture of 5% or less or residual moisture of 50% or more. Thus, by using the current collector containing polytetrafluoroethylene resin, winding of higher density and filming of larger thickness of current collector as compared with the prior art are realized.

Embodiment 3

By decreasing the content of polytetrafluoroethylene resin, and using polyvinyl alcohol as conventional water-soluble resin, it was attempted to make insoluble (resistant to water) by polymerizing (curing) the water-soluble resin. First, in 500 parts by weight of purified water, 2 parts by weight of polytetrafluoroethylene resin and 10 parts by weight of polyvinyl alcohol were dissolved, and further zirconia compound was added as a polymerizing agent. In this solution, 100 parts by weight of activated carbon powder and 10 parts by weight of acetylene black were added and dispersed uniformly, and an electrode solution was prepared. This electrode solution was applied on a conductive foil in a thickness of 80 microns on one side. The resistance to water of this electrode coat film was tested, and it was found that to be resistant to water (insoluble) when heated for 5 minutes to 10 minutes at temperature of 120 deg. C. to 150 deg. C. By thus making resistant to water, the residual moisture in the coat film was hardly adsorbed. At temperature exceeding 300 deg. C., since the decomposition of the resin is promoted, the coat film becomes brittle. Without addition of polymerizing agent, meanwhile, the electrode coat film was not sufficiently resistant to wear if heated for 12 hours at 130 deg. C. or less.

When using zirconia as the polymerization initiator or reaction initiator, it is preferred to add by 1 part by weight or more to 10 parts by weight or less in 100 parts by weight of the binder, and to make insoluble in water by drying or heat treatment. If the content is smaller, the water insolubility of the water-soluble resin is insufficient, and if the content is too large, the product characteristics of the electric double layer capacitor (capacity value, energy density, etc.) are lowered. Such polymerization initiator or reaction initiator is preferred to be a stable metal oxide, not being ionized, after reaction. Therefore, if the polymerization initiator or reaction initiator is left over, the characteristics of the electric double layer capacitor will not be lowered. Moreover, by using the polymerization initiator or reaction initiator, various high polymer materials such as methyl cellulose and hydroxy methyl cellulose may be further used. In such a case, too, it is preferred to combine polytetrafluoroethylene resin with these high polymer materials. Incidentally, unreacted zirconia compound is transformed into a stable zirconia oxide by heating in the presence of oxygen, and hence does not react with residual moisture or nonaqueous electrolyte solution in the electric double layer capacitor.

Embodiment 4

Figure 3:
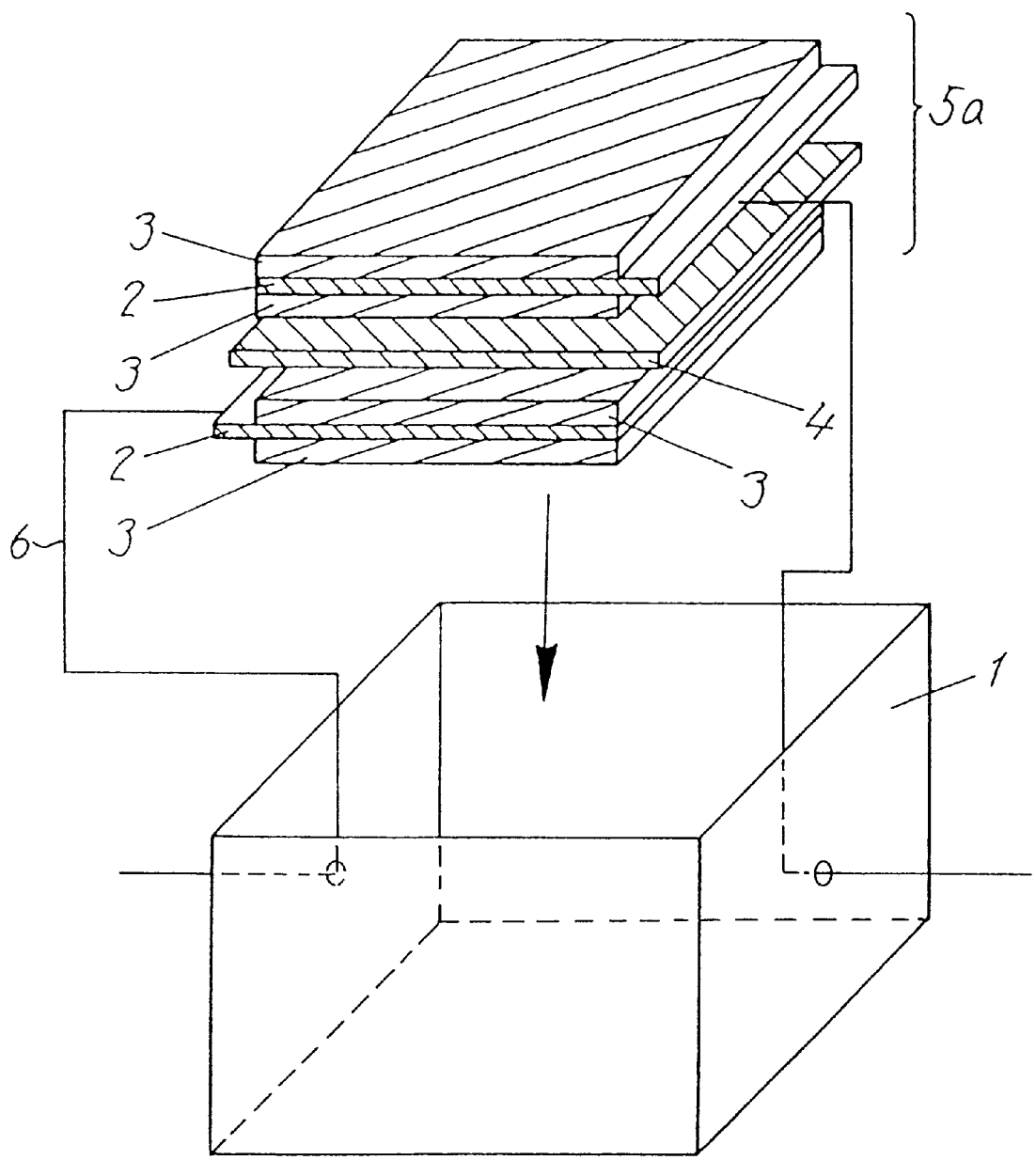
FIG. 3 is a block diagram of laminate type electric double layer capacitor.

In embodiment 4, a laminate type electric double layer capacitor is explained by referring to FIG. 3. In FIG. 3, in a rectangular parallelepiped case 1, a plurality of current collectors 3 formed at least oh one side of a conductive foil 2 are connected through a separator 4. By forming in a laminate 5b, the appearance of the product may be solid, dead angles are decreased and the effective volume is increased. As a result, the capacity per unit volume (capacity density) is higher by nearly 30% as compared with the winding type. Moreover, in a product thickness of several millimeters, the product size can be increased to scores of centimeters square, and it contributes to thin and small design of appliances.

A further detail is described. First, an electric double layer capacitor of ultrathin layer and large laminate type of 1 mm in thickness and 200 mm×300 mm in size was fabricated. The product is desired to have a certain flexibility and resistance to deformation. In such a case, in a conventional rigid current collector, there was a risk of breaking or cracking. Accordingly, from the current collector 3 prepared in embodiment 4, a plurality were cut out in a size of 180 mm×280 mm, and the plurality were laminated through a commercial separator, and sealed in a nonaqueous electrode solution together with lead-out electrode, and an ultrathin electric double layer capacitor was prepared. This capacitor was resistant to bend or warp, and if deflected by force, there was no adverse effect on the electric characteristic or reliability. After such deformation test, the latex part was decomposed and the state of the current collector 3 was inspected, but no abnormality was found.

By way of comparison, using a current collector without undergoing high tension dispersion, a current collector was similarly fabricated, and an electric double layer capacitor of ultrathin layer and large laminate type of 1 mm in thickness and 200 mm×300 mm in size was prepared. In this case, however, the current collector 3 itself was a still plate, having no flexibility and hardly deflecting. When thus prepared capacitor was bent slightly, the electric characteristic dropped suddenly. When analyzed later, it was found that many cracks were formed in the current collector film, and part of the conductive foil was broken, and it was nearly shorted partly. Thus, by high tension dispersion of the electrode solution, fine particles of polytetrafluoroethylene resin were dispersed uniformly, and the performance of the current collector was enhanced.

Meanwhile, by connecting a plurality of such thin electric double layer capacitors in series, and forming into a unit, the dielectric strength can be enhanced, and its conversion efficiency can be improved also when converting voltage by using a DC-DC converter or the like.

Also by connecting a plurality of such thin electric double layer capacitors in parallel, and forming into a unit, the capacity can be increased substantially. Also by sorting and ranking the electric double layer capacitors, a capacitor of a stabler characteristic may be assembled.

Such ultrathin electric double layer capacitor is easier to lower the ESR (equivalent series resistance) as compared with the winding type, and is excellent in frequency characteristic, and hence it may be preferably used in the personal computer, TV, air conditioner, various heating appliances, and others. Moreover, voltage drop can be prevented where a large current is suddenly required such as in a laser beam printer Embodiment 5

Pressing of a current collector containing polytetrafluoroethylene resin was experimented. As a result, invention 1 was raised in density by 10% or more, at a pressure of half or less as compared with prior arts 1 and 2, and was also increased in the product capacity. On the other hand, in the case of prior arts 1 and 2 not containing polytetrafluoroethylene resin, the coat film was adhered to the press surface, and peeling of coat film occurred. This is considered partly because adhesion of the current collector to the press was lowered (the peeling performance was improved) by adding polytetrafluoroethylene resin.

As the conductive agent, carbonaceous conductive materials may be used, such as acetylene black, Ketienblack, and graphite fine powder. Or conductive high polymer such as polypyrol and metal fine powder may be used. At this time, the content of the conductive agent is preferred to be 2 parts by weight or more to 10 parts by weight or less of 100 parts by weight of activated carbon. If the content of the conductive agent is 1 part by weight or less, the conductivity of the electrode coat film is lowered, and it is possible that the ESR (equivalent series resistance) or impedance when assembled into the product may be higher. If added by 15 parts by weight or more, the content of the activated carbon in the product is decreased by the corresponding portion, and the product capacity may be lowered.

Incidentally, by roughening the surface of the conductive foil used in the current collector, the binding performance of the electrode coat film is heightened and the peeling probability of the coat film may be decreased. As roughening means, sand blasting process or etching process may be employed.

Embodiment 6

Embodiment 6 relates to a method of manufacturing an electric double layer capacity by forming a current collector containing activated carbon and conductive agent, by a resin containing latex, on the surface of a conductive foil. As the activated carbon, commercial powder with specific surface area of 1500 to 2000 square meters/g was used, and as a conductive agent, commercial acetylene black was used. In a mixed aqueous solution of aqueous solution of carboxy methyl cellulose and latex, the activated carbon and acetylene black were added, and dispersed, and an electrode solution was prepared. This electrode solution was applied on both sides of a commercial conductive foil in a dry thickness of 100 microns on each side. A plurality of the current collectors 3 were cut in a specified width as shown in FIG. 1, and wound on a separator 4, starting from the minimum winding diameter of 2 mm and finishing at final winding diameter of 8 mm, and a winding 5a was prepared. Each lead-out electrode 6 was connected to a plurality of conductive foils forming the winding 5a, and they were put in a cylindrical case 1 of 10 mm in diameter, and impregnated in a specified electrolyte, and sealed with a sealing material 7 with a terminal 8 (hereinafter called invention 3).

By way of comparison, in an aqueous solution of carboxy methyl cellulose, the activated carbon and acetylene black were added, and dispersed, and an electrode solution was prepared. This electrode solution was applied on both sides of a commercial conductive foil, in a dry thickness of 100 microns on each side. A plurality of the current collectors 3 were cut in a specified width as shown in FIG. 1, and it was attempted to wind them on a separator 4, but when the minimum winding diameter was 2 mm, phenomena as shown in FIGS. 2 (A) and (B) occurred. Accordingly, instead, starting from the minimum winding diameter of 5 mm and finishing at final winding diameter of 8 mm, a winding 5a was prepared. It was put in a cylindrical case of 10 mm in diameter, and an electric double layer capacitor was prepared (hereinafter called prior art 4). As a result of investigation of characteristics of invention 3 and prior art 4, invention 3 was larger in capacity by 10% or more. This is considered because the number of turns is larger (the length of the current collector is longer) in invention 3 as compared with prior art 4.

Embodiment 7

In embodiment 7, the composition ratio of latex and various materials is further optimized. First, in 500 parts by weight of purified water, 12 parts by weight of latex (by dry weight of emulsion with solid content of 50%) was dispersed, and 100 parts by weight of activated carbon powder and 10 parts by weight of acetylene black as conductive agent were further added, and dispersed uniformly, and an electrode solution was prepared. This electrode solution was applied on both sides of a conductive foil (width 100 mm, length 20 m) roughened by chemical etching, by using a coating machine, and a coat film of 80 microns in thickness on each side was formed, and a current collector was prepared.

A lead-out electrode was connected to the obtained foil of electrode coat film, and wound by a specified length on a separator, and put in an aluminum case. In propylene carbonate solution, tetraethyl ammonium tetrafluoroborate was dissolved by 1 mol/liter, and the obtained electrolyte solution was put in the aluminum case, the current collector was wetted, and it was sealed with a rubber packing so that part of the lead-out electrode be exposed outside, and an electric double layer capacitor was prepared (hereafter called invention 4).

By way of comparison, using carboxy methyl cellulose as a prior art, 6 parts by weight was dissolved in 500 parts by weight of purified water, and further 10 parts by weight of activated carbon powder and 10 parts by weight of acetylene black were added, and dispersed uniformly, and it was attempted to prepare electrode solution. However, the activated carbon, in particular, acetylene black could not be dispersed in purified water. Accordingly, it was dispersed by further adding 300 parts by weight of ethylene alcohol (similar effects were obtained by using ammonia aside from alcohol). This electrode solution (called conventional electrode solution hereinafter) was applied on both sides of the roughened conductive foil, and dried, and a coat film of 80 microns in thickness of each side was formed. It was further dried by far infrared rays for 120 minutes at 110 deg. C. This foil of electrode coat film was wound on a separator by a same length (same area), and similarly an electric double layer capacitor was prepared (hereinafter called prior art 5).

As a result of evaluation of invention 4 and prior art 5, invention 4 was smaller in deterioration of characteristic. Then, by redissolving test of each coat film forming the current collector in nonaqueous electrolyte solution or water, the binding strength was measured before and after it. In the case of invention 4, it was free from abnormality also in redissolving test, and the binding strength was not changed before and after the redissolving test.

In prior art 5, on the other hand, the current collector partly eluted in the electrolyte solution, and the binding strength was lowered. As a result of measurement of moisture adsorption of the resin itself (the rate of evaporation of water after wetting), it was found that invention 4 was less likely to be influenced by the effect of moisture adsorption as compared with prior art 5. As a result of bending and stretching the current collector multiple times, crack or peeling did not occur in invention 4, but such crack or peeling phenomenon occurred in prior art 5.

Thus, by using latex (since the latex itself has no water absorbing property or water solubility), the physical characteristics of the current collector could be enhanced, and the product reliability was improved.

Incidentally, the latex itself is an elastic rubber, and by dispersing such material in water in emulsion state, it becomes easier to handle or prepare electrode solution. As the latex, aside from the natural latex, synthetic materials may be used such as SBR (styrene butadiene rubber) and NBR (nitrile butadiene rubber). Examples of such synthetic latex also include butadiene copolymer, styrene butadiene copolymer, and carboxy denatured styrene butadiene copolymer. The emulsion of such latex is often dispersed in emulsion state in water at concentration of 30 to 70 wt. %, and therefore when using in electrode solution, it is preferred to dilute in purified water at specified concentration, and add activated carbon and conductive agent. In the case of emulsion of latex used for electrode coat film, the particle size of emulsion is preferred to be 0.1 micron or less. In the case of electrode solution prepared by using emulsion with particle size of 0.3 micron or more, coagulation or sedimentation may occur.

The latex is often dispersed in purified water by using surface active agent or the like. Accordingly, the pH varies depending on the kind of finished latex. When preparing an electrode solution of electric double layer capacitor, neutral or weak alkaline solution is preferred. Depending on the kind of the activated carbon used in the electric double layer capacitor, carboxyl group as surface chemical substance may be left over as residue depending on the treatment of activated carbon. Such activated carbon may be easily dispersed in a weak alkaline solution of resin. However, when the acidity of the resin solution is high, it is hard to disperse the activated carbon uniformly. Accordingly, the pH of the disperse solution of latex is preferred to be 5 or more to 12 or less.

The content of latex emulsion is preferred to be 4 parts by weight or more to 200 parts by weight (as dry weight) as latex solid content, in 100 parts by weight of activated carbon. When preparing an electrode solution by using only latex as resin, if less than 3 parts by weight, the adhesion strength is weak. If more than 300 parts by weight, the product capacity may be lowered depending on the kind of activated carbon.

In this way, by using the latex in emulsion state, the dispersant in the latex may be utilized effectively, and an electrode solution can be prepared without adding environmental loading substance such as alcohol and ammonia. In particular, by using only water (or purified water) as the volatile content in the electrode solution, the working environment including cleaning of equipment may be improved.

Embodiment 8

In embodiment 8, a laminate type electric double layer capacitor is explained by referring to FIG. 3. In FIG. 3, a plurality of current collectors 3 containing latex formed at least on one side of a conductive foil 2 are connected in a rectangular parallelepiped case 1, through a separator 4. By forming into a laminate 5b, the product appearance may be a cube, and dead angles are decreased and effective volume is increased, so that the capacity per unit volume (capacity density) may be heightened by nearly 30% as compared with the winding type. Moreover, while keeping the product thickness thinly at several millimeters, the product size may be increased to scores of centimeters square, which contributes to thinner layer and smaller size of the object appliance.

A further detail is described below. First, a trial piece of electric double layer capacitor of ultrathin layer and large size laminate type of 1 mm in thickness and 200 mm×300 mm was fabricated. In the case of embodiment 1, the product is required to have a certain elasticity and resistance to deformation. In such a case, in a conventional rigid current collector, it was often cracked or broken. From the current collector 3 prepared in embodiment 8, a plurality of pieces were cut off in dimensions of 180×280 mm, and the plurality were laminated through a commercial separator, and sealed in a nonaqueous electrode solution together with the lead-out electrode, and a ultrathin layer electric double layer capacitor was prepared (hereinafter called invention 5). This invention 5 was resistant to bending and warp, and if deflected by force, adverse effects were not observed in the electric characteristic or reliability. After such deformation test, invention 5 was disassembled, and the current collector 3 was investigated, but no abnormality was detected.

By way of comparison, using carboxy methyl cellulose as conventional current collector, a current collector 3 was prepared similarly, and an electric double layer capacitor of ultrathin layer and large size laminate type of 1 mm in thickness and 200 mm×300 mm was fabricated (hereinafter called prior art 6). In the case of prior art 6, the current collector 3 itself was a stiff plate with no flexibility, hardly deflecting. Damages often occurred in the current collector 3 as shown in FIG. 2 (A) and FIG. 2 (B). In such prior art 6, if bent slightly, the electric characteristic dropped suddenly. As known later by analysis, many cracks were formed in the current collector film, and part of conductive foil was broken, and it was nearly shorted in some parts. Thus, by adding latex to the current collector itself, an electric double layer capacitor of ultrathin layer laminate type can be prepared stably.

By connecting a plurality of such thin layer electric double layer capacitors in series to form into a unit, the dielectric strength is heightened, and in the case of voltage conversion by using DC-DC converter or the like, the conversion efficiency is enhanced.

Also by connecting a plurality of such thin layer electric double layer capacitors in parallel to form into a unit, the capacity can be increased substantially. Also by sorting and ranking the electric double layer capacitors, stable characteristic may be realized.

Such ultrathin layer electric double layer capacitor, as compared with the winding type, is easier to lower the ESR (equivalent series resistance), and is superior in frequency characteristics, so that it can be used in personal computer, TV, air conditioner, and various air heating machines. Or in the case where a large current is required instantly as in laser beam printer, it can be used in an application for preventing voltage drop.

Embodiment 9

In 500 parts by weight of purified water, 12 parts by weight of latex (using emulsion with solid content of 30%) and carboxy methyl cellulose partly replaced with NH4 ions (hereinafter called CMC-NH4) were dispersed, and further 10 parts by weight of activated carbon powder and 10 parts by weight of acetylene black were added and dispersed uniformly, and an electrode solution was prepared. This electrode solution was applied on a roughened conductive foil, and dried, and an electric double layer capacitor was prepared in the same manner as in embodiment 1 (hereinafter called invention 6).

By way of comparison, using carboxy methyl cellulose as prior art (partly replaced with NH4 ions), an electric double layer capacitor was prepared (hereafter called prior art 7).

As a result of comparison of finished coat films, the current collector in invention 6 could be wound to a smaller diameter of 1 mm. On the other hand, in the case of prior art 7, if wound to a diameter smaller than 3 mm, crack or peeling occurred. Therefore, the length of the current collector that can be wound in a product (aluminum case) was longer in invention 6 as compared with prior art 7, and the product capacity and energy density could be enhanced.

Meanwhile, in the case of a mixture of latex and conventional water-soluble resin, the concentration of the prepared electrode solution may vary significantly depending on the kind of the activated carbon or conductive agent to be added (in particular, the particle size and specific surface area of these materials). Accordingly, the composition should be preferably set so that the viscosity of the electrode solution may be in a range of 2 poise or more to 200 poise or less. If less than 0.5 poise, the viscosity is too low to form a coat film in a thickness of 50 microns or more, and the thickness difference may be more than plus or minus 5 microns. If the viscosity is more than 300 poise, although it is easy to form a coat film in a thickness of 50 microns or more, the leveling (flow of electrode solution itself so as to eliminate uneven coating by the action of gravity) is poor, and the productivity is lowered. To manufacture as an electric double layer capacitor, the thickness difference of the current collector (difference of maximum thickness and minimum thickness) is preferred to be 5 microns or less, and if exceeding 10 microns, if a current collector of a same length is wound, the diameter of the finished winding may be different.

In the case of the current collector containing latex of the invention, only latex may be used as the binder. When applying the electrode solution containing latex on the conductive foil, a coating machine such as doctor blade may be used. Depending on the kind of the coating machine, an appropriate electrode solution viscosity may be specified. In such a case, aside from latex, water-soluble high polymer (carboxy methyl cellulose, polyvinyl alcohol, methyl cellulose, hydroxy ethyl cellulose, or other water-soluble high polymer) may be added as required, and a viscosity suited to application (for example, 5 to 100 poise) may be adjusted. As a result, the thickness difference of coat film may be kept at a high precision of 5 microns or less, and the manufacturing process may be stabilized, and product fluctuations may be decreased.

Embodiment 10

It was attempted to make insoluble (resistant to water) by decreasing the latex resin, increasing the conventional water-soluble resin, and further polymerizing (curing) the water-soluble resin. First, in 500 parts by weight of purified water, 2 parts by weight of latex and 10 parts by weight of polyvinyl resin were dissolved, and further zirconia compound was added as polymerizing agent. In this mixture, further, 10 parts by weight of activated carbon and 10 parts by weight of acetylene black were added, and dispersed uniformly, and an electrode solution was obtained. This electrode solution was applied on a roughened conductive foil in a thickness of 80 microns on each side. It was attempted to make this electrode coat film resistant to water, and it was found to be resistant to water (insoluble) when heated for about 5 to 10 minutes at temperature of 120 deg. C. to 150 deg. C. By thus making resistant to water, the residual moisture of the coat film was hardly adsorbed. At temperature exceeding 300 deg. C., however, since decomposition of the resin is promoted, the coat film becomes brittle. Without addition of polymerizing agent, if heated for 12 hours at 130 deg. C. or less, the electrode coat film was not sufficiently resistant to water When using zirconia compound as such polymerization initiator or reaction initiator, it is preferred to add by 1 part by weight or more to 10 parts by weight or less in 100 parts by weight of the binder, and make insoluble in water by drying or heating. If the addition is insufficient, the water-soluble resin is not sufficiently insoluble in water. If the addition is excessive, the product characteristics of the electric double layer capacitor (capacity value, energy density, etc.) are lowered. As such polymerization initiator or reaction initiator, it is preferred that it is not ionized after reaction but becomes a stable metal oxide. Consequently, if the polymerization initiator or reaction initiator is left over, it does not deteriorate the characteristic of the electric double layer capacitor. Moreover, by using the polymerization initiator or reaction initiator, in addition, various high polymer materials can be used such as methyl cellulose and hydroxymethyl cellulose. Even in this case, it is preferred to use together with latex. Concerning the unreacted zirconia compound, by heating in the presence of oxygen, it is transformed into a stable zirconia oxide. It does not react with the residual moisture or nonaqueous electrode solution in the electric double layer capacitor.

Incidentally, when the glass transition temperature (a kind of softening point) of latex resin is 20 deg. C. or higher, the flexibility of the obtained current collector or coat film is lowered. Hence, the glass transition temperature of the latex resin is preferred to be 0 deg. C. or less, more preferably −10 deg. C. or less.

As the resin to be mixed with latex, for example, carboxy methyl cellulose, polyvinyl alcohol, methyl cellulose, hydroxy propyl cellulose, and other water-soluble high polymer materials may be used. By mixing with such water-soluble high polymer materials, both water resistance and binding performance of coat film may be realized. By adding such resin, whether the thickness is less than 0.1 mm or the thickness is more than 1. mm, the viscosity may be adjusted easily in a range of, for example, 1 poise or more to 200 poise or less so that a thickness depending on the product may be freely applied. Without addition of such resin, the viscosity of the electrode solution is 0.5 poise or less, and the plasticity (thixotropy) is further heightened, and a thickness of 0.05 mm or less may be applied, but a thickness of 0.1 mm or more cannot be applied. Or, a same thickness cannot be applied every time. Thus, by using latex together with water-soluble high polymer such as carboxy methyl cellulose, the coat film precision can be enhanced.

In the invention, the density of the current collector is preferred to be 0.35 g/cc or more to 1.50 g/cc. If less than 0.30 g/cc, the density of current collector is low, and crack or other defect may hardly occur in the coat film when winding, but the capacity is low when assembled into product. If more than 1.55 g/cc, the nonaqueous electrode solution hardly permeates into the current collector, and the capacity is lowered when assembled in product, or the impedance may be heightened.

Embodiment 11

Pressing of a current collector (invention 6 of embodiment 9) containing latex was experimented. As a result, invention 6 was raised in density by 10% or more, at a pressure of half or less as compared with prior art 7. The flexibility or binding strength was not lowered before and after the pressing test. The current collector was free from elongation (in particular, deformation of conductive foil). Thus, by lowering the press pressure or calender pressure, the facility cost can be lowered and the productivity can be raised. At the same time, elongation of the current collector (in particular, deformation of conductive foil) could be suppressed. On the other hand, in the case of prior art 7, by pressing, the flexibility and binding strength of the coat film were lowered. Moreover, when the pressure was raised, the current collector was deformed.

As the conductive agent, carbonaceous conductive materials may be used, such as acetylene black, Ketienblack, and graphite fine powder. Or conductive high polymer such as polypyrol and metal fine powder may be used. At this time, the content of the conductive agent is preferred to be 2 parts by weight or more to 10 parts by weight or less of 100 parts by weight of activated carbon. If the content of the conductive agent is 1 part by weight or less, the conductivity of the electrode coat film is lowered, and it is possible that the ESR (equivalent series resistance) or impedance when assembled into the product may be higher. If added by 15 parts by weight or more, as compared with the rubber material dissolved in solvent, since the rubber material of the invention is an emulsion, the capacity is not particularly decreased. Accordingly, if added by 200 parts by weight or more, the desired product capacity can be obtained. If added by more than 500 parts by weight, since the amount of activated carbon usable in the product is decreased, and hence the product capacity may be lowered.

Embodiment 12

Embodiment 12 explains the result of experiment on particle size of latex. First, five kinds of latex with particle size of 10 microns, 5 microns, 1 micron, 0.1 micron, and 0.01 micron were prepared. After fabrication of trial products of current collectors as shown in embodiment 1, when latex of 10 microns and 5 microns in particle size was dispersed together with activated carbon powder, aggregates were likely to be formed, and the electric characteristics of the obtained electric double layer capacitor itself were lower than the design values. On the other hand, as for three kinds of latex with particle size of 1 micron, 0.1 micron and 0.01 micron, if dispersed together with activated carbon powder, aggregates were not formed, and the coating performance and mass producibility were excellent, and electric characteristics conforming to the design values were obtained. Thus, by defining the particle size of latex at 1 micron or less, if mixed with activated carbon or conductive agent, aggregate are hardly formed. Meanwhile, if the particle size of latex is less than several angstroms, the pores of the activated carbon surface are filled up to make it hard to form the electric double layer, and hence, the size is preferred to be more than 10 angstroms.

Embodiment 13

As the resin in the current collector, only latex resin may be used, but it may be also blended with one or more of carboxy methyl cellulose resin, polyvinyl alcohol, methyl cellulose, and hydroxyethyl cellulose. When the electrode solution is prepared by using latex resin only, the viscosity of the obtained electrode solution is too low, and it may be hard to apply. In such a case, by mixing the latex resin with any one of the water-soluble resins mentioned above, the viscosity of the electrode solution may be adjusted.

When mixing such resin and latex resin, first, latex resin (latex aqueous solution) is put in purified water, and dispersed uniformly (until a uniform milky white solution is obtained), and, preferably, resin powder such as carboxy methyl cellulose is added, and stirred, and dissolved. If latex aqueous solution is added in the resin solution, it may require a considerable labor to disperse latex particles uniformly, and it may lead to aggregation or uneven dispersion.

Such latex particles are in emulsion state dispersed in a solvent mainly composed of water containing a slight amount of surface active agent, and the pH of this emulsion is preferred to be 4 or more to 12 or less. If the pH of the emulsion is less than 3 or more than 13, the activated carbon may not be dispersed uniformly.

When preparing an electrode solution, by using ion exchange water or purified water, it is effective to lower the concentration of impurity ions which may be part of the cause of lowering the reliability of the electric double layer capacitor. At this time, by adding ammonia or alcohol, the wettability of the activated carbon may be improved.

Incidentally, according to the Standard Dictionary of Chemical Terms edited by Japan Society of Chemistry (Maruzen, 1991), latex is "formerly defined to be a natural rubber latex, but ever since development of synthetic rubber and synthetic resin emulsion other than rubber compound, all of them are collectively called latex." That is, in this invention, the latex is not limited to natural rubber and synthetic rubber alone, but includes emulsion of synthetic resin, and such resin scatters among particles of activated carbon, acetylene black, Ketienblack, and others, and they cause the particles to contact with each other. In the invention, the emulsion is, according to the same Standard Dictionary of Chemical Terms, "a system of dispersion of other hardly soluble liquid fine particles in a liquid solute," but aside from liquid fine particles, it may be also tacky or elastic gel fine particles. The solvent may be oil, but considering the environmental problems and working efficiency, water or the like is preferred. Dissolving is, according to same Standard Dictionary of Chemical Terms, "a phenomenon of melting of a substance in liquid to be a uniform liquid phase," and in the resin material dissolved in the conventional solvent, the product characteristic may be lowered in order to cover the surface of fine particles of activated carbon or the like (and also fine pores on the surface). However, if the emulsion or latex in the invention is dispersed in the electrode solution, it is predicted to scatter in the finished current collector 3, and therefore it is low in possibility of clogging of the activated fine pores with activated carbon.

As a low softening point resin, a resin of which Tg (glass transition temperature) is −10 deg. C. or less may be selected, and such resin may be processed into latex. Low softening point resins include many resins that can be polymerized or crosslinked, and by selecting such resins, the product reliability is enhanced. As the low softening point resin of which Tg is −10 deg. C. or less, a resin containing plasticizer may be used, and such examples include vinyl chloride, ethylene-vinyl chloride copolymer resin, vinylidene chloride latex, chlorinated resin, vinyl acetate resin, polyvinyl butyral, polyvinyl formal, bisphenol system epoxy resin, polyurethane resin and others. Moreover, SBR (styrene butadiene rubber), butadiene rubber, isoprene rubber, NBR (acrylonitrile-butadiene copolymer rubber), urethane rubber, silicone rubber, acrylic rubber, and various elastomers may be used. By processing such resins to be soluble in water, or fine granular (latex), working efficiency and safety of electrode solution in high pressure dispersion may be enhanced.

Embodiment 14

The viscosity of the electrode solution is preferred to be in a range of 1 poise or more to 200 poise or less in consideration of the coating performance as current collector. The thickness of the current collector is preferred to be 20 microns or more, and there is no problem if more than 500 microns. The thickness difference of the current collector is preferred to be 5 microns or less, and capacity fluctuations of product are decreased, and stable products are presented.

Together with polytetrafluoroethylene resin, by adding a low softening point resin, it is effective for prevention of crack of coat film. Such low softening point resin is preferred to have Tg (glass transition temperature) of −10 deg. C. or less. If Tg is more than −10 deg. C., it is stiff at room temperature, and when a current collector is formed, breakage, peeling or fine crack may be formed. Low softening point resins include many resins that can be polymerized or crosslinked, and by selecting such resins, the product reliability is enhanced. As the low softening point resin of which Tg (glass transition temperature) is −10 deg. C. or less, a resin containing plasticizer may be used, and such examples include vinyl chloride, ethylene-vinyl chloride copolymer resin, vinylidene chloride latex, chlorinated resin, vinyl acetate resin, polyvinyl butyral, polyvinyl formal, bisphenol system epoxy resin, polyurethane resin and others. Moreover, SBR (styrene butadiene rubber), butadiene rubber, isoprene rubber, NBR (acrylonitrile-butadiene copolymer rubber), urethane rubber, silicone rubber, acrylic rubber, and various elastomers may be used. By processing such resins to be soluble in water, or fine granular (latex), working efficiency and safety of electrode solution in high pressure dispersion may be enhanced.

Thus, by using latex (since the latex itself has no water absorbing property or water solubility), the physical characteristics of the current collector could be enhanced, and the product reliability was improved.

Incidentally, the latex itself is an elastic rubber, and by dispersing such material in water in emulsion state, it becomes easier to handle or prepare electrode solution. As the latex, aside from the natural latex, synthetic materials may be used such as. SBR (styrene.-butadiene rubber) and NBR (nitrile butadiene rubber). Examples of such synthetic latex also include butadiene copolymer, styrene butadiene copolymer, and carboxy denatured styrene butadiene copolymer. The emulsion of such latex is often dispersed in emulsion state in water at concentration of 30 to 70 wt. %, and therefore when using in electrode solution, it is preferred to dilute in purified water at specified concentration, and add activated carbon and conductive agent. In the case of emulsion of latex used for electrode coat film, the particle size of emulsion is preferred to be 0.1 micron or less. In the case of electrode solution prepared by using emulsion with particle size of 0.3 micron or more, coagulation or sedimentation may occur.

The latex is often dispersed in purified water by using surface active agent or the like. Accordingly, the pH varies depending on the kind of finished latex. When preparing an electrode solution of electric double layer capacitor, neutral or weak alkaline solution is preferred. Depending on the kind of the activated carbon used in the electric double layer capacitor, carboxyl group as surface chemical substance may be left over as residue depending on the treatment of activated carbon. Such activated carbon may be easily dispersed in a weak alkaline solution of resin. However, when the acidity of the resin solution is high, it is hard to disperse the activated carbon uniformly. Accordingly, the pH of the disperse solution of latex is preferred to be 5 or more to 12 or less.

The content of latex emulsion is preferred to be 1 part by weight or more to 200 parts by weight (as dry weight) as latex solid content, in 100 parts by weight of activated carbon. When preparing an electrode solution by using only latex as resin, if less than 0.5 part by weight, the adhesion strength is weak. If more than 250 parts by weight, the product capacity may be lowered.

Further, by using the latex in emulsion state, the dispersant in the latex may be utilized effectively, and an electrode solution can be prepared without adding environmental loading substance such as alcohol and ammonia. Thus, the working environment including cleaning of equipment may be improved.

Incidentally, according to the Standard Dictionary of Chemical Terms edited by Japan Society of Chemistry (Maruzen, 1991), latex is "formerly defined to be a natural rubber latex, but ever since development of synthetic rubber and synthetic resin emulsion other than rubber compound, all of them are collectively called latex." That is, in this invention, the latex is, not limited to natural rubber and synthetic rubber alone, but includes emulsion of synthetic resin, and such resin scatters among particles of activated..carbon, acetylene black, Ketienblack, and others, and they cause the particles to contact with each other. In the invention, the emulsion is, according to the same Standard Dictionary of Chemical Terms, "a system of dispersion of other hardly soluble liquid fine particles in a liquid solute," but aside from liquid fine particles, it may be also tacky or elastic gel fine particles. The solvent may be oil, but considering the environmental problems and working efficiency, water or the like is preferred. Dissolving is, according to same Standard Dictionary of Chemical Terms, "a phenomenon of melting of a substance in liquid to be a uniform liquid phase," and in the resin material dissolved in the conventional solvent, the product characteristic may be lowered in order to cover the surface of fine particles of activated carbon or the like (and also fine pores on the surface). However, if the emulsion or latex in the invention is dispersed in the electrode solution, it is predicted to scatter in the finished current collector, and therefore it is low in possibility of clogging of the activated fine pores with activated carbon.

Embodiment 15

Figure 4:
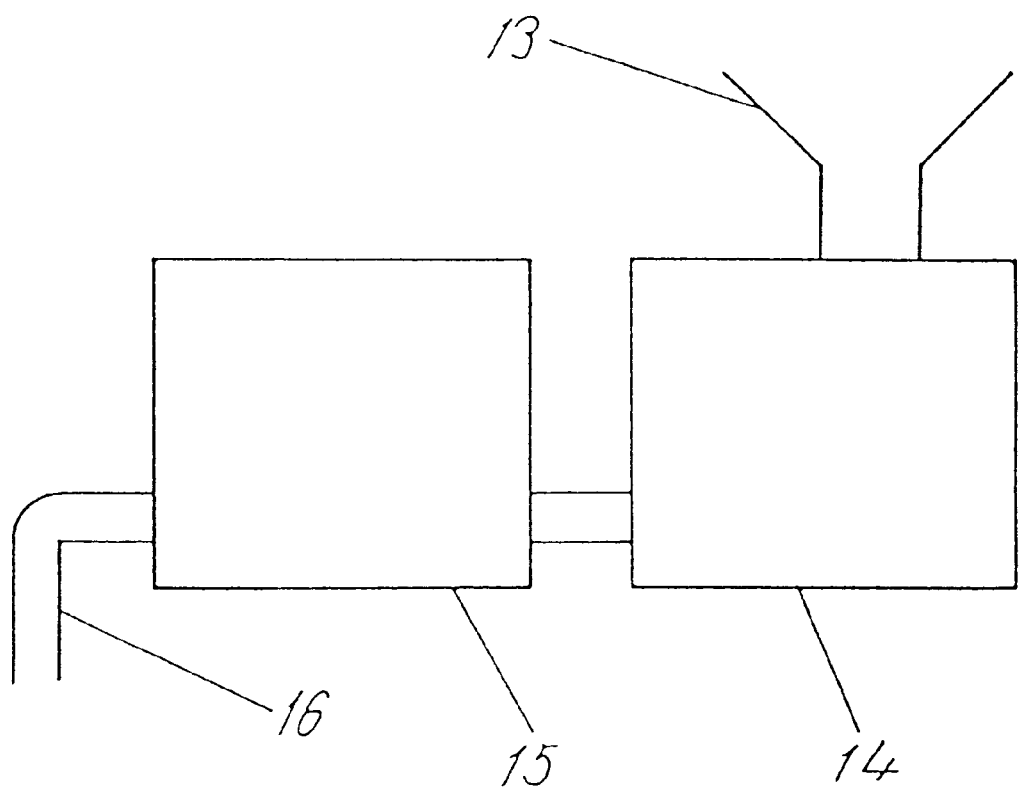
FIG. 4 is a block diagram of a high pressure dispersion machine.

In embodiment 15, using latex, results of experiment of high pressure dispersion are shown. In the case of the conventional current collector not containing latex of which thickness is 50 microns, if the winding diameter was 5 mm, the result was as shown in FIG. 4 (C). As the thickness was increased to 80 microns, the result was sometimes inferior winding (Δ) as in FIG. 4 (B). At the thickness exceeding 150 microns, if the winding diameter was 5 mm, it was sometimes impossible to wind (x) as shown in FIG. 4 (A). At the thickness of 50 microns, as the winding diameter was reduced to 4 mm, 3 mm, and 2 mm, the phenomenon of inferior winding (Δ) in FIG. 4 (B) tended to occur. Concerning such winding performance of the current collector, it is empirically known that it is also influenced by the residual moisture in the current collector coat film. Accordingly, by adjusting the residual moisture in the current collector at 30% or more, occurrence of fine cracks 11 or fracture 10 in winding may be decreased. But it is difficult to control the residual moisture accurately, and it was a problem that there were large effects depending on season and ambient temperature.

On the other hand, in the case of the current collector containing latex of embodiment 3, if the current collector thickness is increased to 100 microns or 200 microns and the winding diameter is 2 mm or less, fine cracks 11 or fracture 10 did not occur when winding. As a result of similar experiment by varying the residual moisture of the current collector, it was similarly free from fine cracks 11 or fracture 10 at the residual moisture of 5% or less or residual moisture of 50% or more. Thus, by using the current collector containing latex, winding of higher density and filming of larger thickness of current collector as compared with the prior art are realized.

Embodiment 16

Embodiment 16 relates to a method of manufacturing an electric double layer capacity by forming a current collector containing activated carbon and conductive agent, by a resin containing latex, on the surface of a conductive foil. As the activated carbon, commercial powder with specific surface area of 1500 to 2000 square meters/g was used, and as a conductive agent, commercial acetylene black was used. In a mixed aqueous solution of aqueous solution of carboxy methyl cellulose and latex, the activated carbon and acetylene black were added, and dispersed at high pressure, and an electrode solution was prepared. This electrode solution was applied on both sides of a commercial conductive foil in a dry thickness of 100 microns on each side. A plurality of the current collectors 3 were cut in a specified width as shown in FIG. 1, and wound on a separator 4, starting from the minimum winding diameter of 2 mm and finishing at final winding diameter of 8 mm, and a winding 5a was prepared Each lead-out electrode 6 was connected to a plurality of conductive foils forming the winding 5a, and they were put in a cylindrical case 1 of 10 mm in diameter, and impregnated in a specified electrolyte, and sealed with a sealing material 7 with a terminal 8 (hereinafter called invention 7).

By way of comparison, in an aqueous solution of carboxy methyl cellulose, the activated carbon and acetylene black were added, and dispersed at high pressure, and an electrode solution was prepared. This electrode solution was applied on both sides of a commercial conductive foil, in a dry thickness of 100 microns on each side. A plurality of the current collectors 3 were cut in a specified width as shown in FIG. 1, and it was attempted to wind them on a separator 4, but when the minimum winding diameter was 2 mm, phenomena as shown in FIG. 4 (A) and FIG. 4 (B) occurred. Accordingly, instead, starting from the minimum winding diameter of 5 mm and finishing at final winding diameter of 8 mm, a winding 9 was prepared. It was similarly put in a cylindrical case of 10 mm in diameter, and an electric double layer capacitor was prepared (hereinafter called prior art 8). As a result of investigation of characteristics of invention 7 and prior art 8, invention 7 was larger in capacity by 10% or more. This is considered because the number of turns is larger (the length of the current collector is longer) in the latex product as compared with prior art 8.

A further detail is described below. In 500 parts by weight of purified water, 12 parts by weight of latex (by dry weight of emulsion with solid content of 50%) was dispersed, and further 100 parts by weight of activated carbon powder and 10 parts by weight of acetylene black as conductive agent were added, and dispersed at high pressure, and an electrode solution was prepared.

Thus dispersed electrode solution was applied on both sides of a conductive foil (width 100 mm, length 20 m) roughened by chemical etching, by using a coating machine, and a coat film of 80 microns in thickness on each side was formed, and a current collector 3 was prepared.

A lead-out electrode was connected to the obtained foil of electrode coat film, and wound by a specified length on a separator, and put in an aluminum case. In propylene carbonate solution, tetraethyl ammonium tetrafluoroborate was dissolved by 1 mol/liter, and the obtained electrolyte solution was put in the aluminum case, the current collector was wetted, and it was sealed with a rubber packing so that part of the lead-out electrode be exposed outside, and an electric double layer capacitor was prepared (hereafter called invention 8).

By way of comparison, using carboxy methyl cellulose as a prior art, 6 parts by weight was dissolved in 500 parts by weight of purified water, and further 10 parts by weight of activated carbon powder and 10 parts by weight of acetylene black were added, and dispersed uniformly, and it was attempted to prepare electrode solution. However, the activated carbon, in particular, acetylene black could not be dispersed in purified water. Accordingly, it was dispersed by further adding 300 parts by weight of ethylene alcohol (similar effects were obtained by using ammonia aside from alcohol). This electrode solution (called conventional electrode solution hereinafter) was applied on both sides of the roughened conductive foil, and dried, and a coat film of 80 microns in thickness of each side was formed. It was further dried by far infrared rays for 120 minutes at 110 deg. C. This foil of electrode coat film was wound on a separator by a same length (same area), and an electric double layer capacitor was prepared (hereinafter called prior art 9).

As a result of acceleration test of invention 8 and prior art 9, invention 8 was smaller in deterioration of characteristic. Then, by redissolving test of each coat film forming the current collector in nonaqueous electrolyte solution or water, the binding strength was measured before and after it. In the case of the invention, it was free from abnormality also in redissolving test, and the binding strength was not changed before and after the redissolving test.

In prior art 9, on the other hand, redissolving was observed, and the binding strength was lowered after redissolving test. As a result of measurement of moisture adsorption of the resin itself (the rate of evaporation of water after wetting), it was found that invention 8 was smaller in moisture absorption than prior art 9 by one digit or more. As a result of bending and stretching the current collector multiple times, crack or peeling did not occur in invention 8, but such crack or peeling phenomenon occurred in prior art 9.

Embodiment 17

In 500 parts by weight of purified water, 12 parts by weight of latex (using emulsion with solid content of 30%) and carboxy methyl cellulose partly replaced with NH4 ions (hereinafter called CMC-NH4) were dispersed, and further 10 parts by weight of activated carbon powder and 10 parts by weight of acetylene black were added and dispersed uniformly, and an electrode solution was prepared. For this dispersion, a high pressure dispersion machine as shown in FIG. 4 was used. In FIG. 4, reference numeral 13 is an inlet, through which the electrode solution after preliminary kneading is charged. Reference numeral 14 is a pressure unit, which pressurizes the charged electrode solution to a high pressure of over 100 kg/cm$^2$ by a hydraulic pump or the like. Reference numeral 15 is a dispersion mixer, which disperses by spraying the electrode ink at high pressure to a special jig, or colliding electrode solutions ejected at high pressure from a plurality of capillaries with each other. In the pressure unit, the electrode solution is boosted to a high pressure of at least over 100 kg/cm$^2$. The pressure at this time of dispersion can be monitored by mounting a pressure gauge on the pressure unit 14 (or between the pressure unit 14 and the dispersion mixer 15). The inside of the dispersion mixer 15 is partly formed of diamond, ceramic or cemented carbide, so that it can be protected from abrasion. The electrode solution pressurized over 100 kg/cm$^2$ is introduced into the dispersion mixer, and the liquids are collided with each other (or the liquid is collided against the jig) at a speed over the sonic speed to be dispersed. The electrode solution thus dispersed at high pressure is discharged from an outlet 4. As such machine, a pressure type homogenizer manufactured by Gorin, U. S., may be used. By using such machine, by dispersing while applying a high pressure over 100 kg/cm$^2$ (or over 3000 kg/cm$^2$ depending on machine specification) to the electrode solution, the density of the coat film of current collector may be easily raised over 0.50 g/cc. In order to extend the life of the dispersion machine and stabilize dispersion while avoiding entry of impurities into the electrode solution, the dispersion mixer should be preferably made of diamond, ceramic or cemented carbide.

This electrode solution was applied on a roughened conductive foil, and dried, and an electric double layer capacitor was prepared in the same manner as in embodiment 1 (hereinafter called invention 9).

By way of comparison, using carboxy methyl cellulose as prior art (partly replaced with NH4 ions), an electric double layer capacitor was prepared without adding latex emulsion (hereafter called prior art 10).

As a result of comparison of finished coat films, the current collector in invention 9 could be wound to a smaller diameter of 1 mm. On the other hand, in the case of prior art 10, if wound to a diameter smaller than 3 mm, crack or peeling occurred. Therefore, the length of the current collector that can be wound in a product (aluminum case) was longer in invention 9 as compared with prior art 10, and the product capacity and energy density could be enhanced.

Meanwhile, in the case of a mixture of latex and conventional water-soluble resin, the concentration of the prepared electrode solution may vary significantly depending on the kind of the activated carbon or conductive agent to be added (in particular, the particle size and specific surface area of these materials). Accordingly, the composition should be preferably set so that the viscosity of the electrode solution may be in a range of 1 poise or more to 200 poise or less. If less than 0.5 poise, the viscosity is too low to form a coat film in a thickness of 50 microns or more, and the thickness difference may be more than plus or minus 5 microns. If the viscosity is more than 300 poise, although it is easy to form a coat film in a thickness of 50 microns or more, the leveling (flow of electrode solution itself so as to eliminate uneven coating by the action of gravity) is poor, and the productivity is lowered. To manufacture as an electric double layer capacitor, the thickness difference of the current collector (difference of maximum thickness and minimum thickness) is preferred to be 5 microns or less. If exceeding 10 microns, when a current collector of a same length is wound, the diameter of the finished winding may be different. Hence, when applying by using a coating machine (doctor blade coater, etc.), as explained herein, by adding water-soluble high polymer, the viscosity can be optimized to an easily applicable viscosity (preferably about 2 poise to 100 poise), and the thickness difference of coat film .can -be suppressed within 5 microns, so that stabilization of manufacturing process and decrease of product fluctuations may be realized.

As a conventional method of dispersion of electrode solution, as a result of experiment by using rotary homogenizer, ultrasonic homogenizer, and various mixers, ball mills and sand mills, the density of coat film was about 0.25 g/cc to 0.30 g/cc. On the other hand, the coat film density by high pressure dispersion was 0.50 g/cc to 0.65 g/cc, and the product capacity and density could be notably improved. By way of comparison, an ultrasonic homogenizer was used, but the coat film density was hardly increased, and its dispersion effect was not recognized.

In the case of latex, various surface active agents are often added as stabilizer. Accordingly, in the conventional methods of dispersion (various mixers, ball mill, sand mill, etc.), the electrode solution is stirred together with air, and hence bubbles are likely to be formed. The bubbles formed in the electrode solution are hardly removed completely if treated in vacuum, and are left over in the coat film of the current collector (causing to lower the density or lower the capacity), and spots are left over on the dried surface. Anyway, the product capacity and density are lowered. On the other hand, in the case of high pressure dispersion, the electrode solutions impinge with each other at high pressure (without contacting with air), or hit against a collision plate to be dispersed, so that bubbles are hardly formed.

By mixing latex in electrode coat film, the flexibility of coat film and bending strength could be substantially improved. If the thickness of coat film was Increased over 500 microns (to about 5 mm), a specified product could be manufactured without causing defects such as crack (coat film cracking or coat film peeling) when winding. Since both flexibility and binding strength of coat film could be notably improved at the same time, processing by press or calender was possible while suppressing the deformation of conductive foil to a minimum limit. As a result, the coat film density could be easily increased enough over 0.40 g/cc, that is, up to 0.75 or 0.95, and the product performance was enhanced. Incidentally, when the coat film density was over 1.50 g/cc, the product capacity dropped. This is considered because the density was too high to fill the inside of the current collector with nonaqueous electrode solution (and ions) for forming the electric double layer.

Embodiment 18

It was attempted to make insoluble (resistant to water) by decreasing the latex resin, increasing the conventional water-soluble resin, and further polymerizing (curing) the water-soluble resin. First, in 500 parts by weight of purified water, 2 parts by weight of latex and 10 parts by weight of polyvinyl alcohol resin were dissolved, and further zirconia compound was added as polymerizing agent. In this mixture, further, 10 parts by weight of activated carbon powder and 10 parts by weight of acetylene black were added, and dispersed uniformly, and an electrode solution was obtained. This electrode solution was applied on a roughened conductive foil in a thickness of 80 microns on each side. It was attempted to make this electrode coat film resistant to water, and it was found to be resistant to water (insoluble) when heated for about 5 to 10 minutes at temperature of 120 deg. C. to 150 deg. C. By thus making resistant to water, the residual moisture of the coat film was hardly adsorbed. At temperature exceeding 300 deg. C., however, since decomposition of the resin is promoted, the coat film becomes brittle. Without addition of polymerizing agent, if heated for 12 hours at 130 deg. C. or less, the electrode coat film was not sufficiently resistant to water When using zirconia compound as polymerization initiator or reaction initiator, it is preferred to add by 1 part by weight or more to 10 parts by weight or less in 100 parts by weight of the binders and make insoluble in water by drying or heating. If the addition is insufficient, the water-soluble resin is not sufficiently insoluble in water. If the addition is excessive, the product characteristics of the electric double layer capacitor (capacity value, energy density, etc.) are lowered. As such polymerization initiator or reaction initiator, it is preferred that it is not ionized after reaction but becomes a stable metal oxide. Consequently, if the polymerization initiator or reaction initiator is left over, it does not deteriorate the characteristic of the electric double layer capacitor. Moreover, by using the polymerization initiator or reaction initiator, in addition, various high polymer materials can be used such as methyl cellulose and hydroxymethyl cellulose. Even in this case, it is preferred to use together with latex. The unreacted zirconia compound is, by heating in the presence of oxygen, transformed into a stable zirconia oxide. It does not react with the residual moisture or nonaqueous electrode solution in the electric double layer capacitor.

Incidentally, when the glass transition temperature (a kind of softening point) of latex resin is 20 deg. C. or higher, the flexibility of the obtained current collector or coat film is lowered. Hence, the glass transition temperature of the latex resin is preferred to be 0 deg. C. or less, more preferably −10 deg. C. or less.

Embodiment 19

Pressing of a current collector containing latex was experimented. In the case of current collector containing latex, as compared with the current collector without latex, the density was raised by 10% or more at a pressure of half or less. The flexibility or binding strength was not lowered before and after the pressing test. The current collector was also free from elongation (in particular, deformation of conductive foil). Thus, by lowering the press pressure or calender pressure, the facility cost can be lowered and the productivity can be raised, while the elongation of the current collector (in particular, deformation of conductive foil) could be suppressed. On the other hand, in the case of the prior art, by pressing, the flexibility and binding strength of the coat film were lowered. Moreover, when the, pressure was raised, the current collector was deformed.

As the conductive agent, carbonaceous conductive materials may be used, such as acetylene black, Ketienblack, and graphite fine powder. Or conductive high polymer such as polypyrol and metal fine powder may be used. At this time, the content of the conductive agent is preferred to be 2 parts by weight or more to 10 parts by weight or less of 100 parts by weight of activated carbon. If the content of the conductive agent is 1 part by weight or less, the conductivity of the electrode coat film is lowered, and it is possible that the ESR (equivalent series resistance) or impedance when assembled into the product may be higher. If added by 15 parts by weight or more, the amount of activated carbon usable in the product is decreased, and hence the product capacity may be lowered.

Meanwhile, the coat film density varies also with the mean particle size or particle size distribution of the activated carbon being used. Anyway, however, in the case of high pressure dispersion method, the coat film density could be increased by 10% to 30%, and the product capacity could be raised by 50% or more.

The pressure of the high pressure dispersion machine is required to be more than 100 kg/cm$^2$. At under 80 kg/cm$^2$, the pressure in insufficient, and the effect of dispersion is often insufficient. The dispersion pressure is preferred to be 250 kg/cm$^2$ or more, or 500 kg/cm$^2$ or more. In the case of such high pressure dispersion, the electrode solution may generate heat by about 50 deg. C. or 80 deg. C., which may cause lot fluctuations of the electrode solution. It is hence preferred to combine with a water cooling mechanism for minimizing the heat generation of electrode solution. It is also possible to use a superhigh pressure dispersion machine capable of exceeding over 1000 kg/cm$^2$. The number of times of dispersion is not limited to one only. By repeating dispersion of specified electrode solution a plurality of times by a same dispersion machine, the quality of the electrode solution can be stabilized. If the dispersion pressure pulsates (the pressure rising and falling regularly), by dispersing repeatedly a plurality of times, the degree of dispersion can be stabilized.

Aside from the winding type electric double layer capacitor, needless to say, it can be also applied to the laminate type electric double layer capacitor. Moreover, whether winding type or laminate type, by connecting a plurality in series, the capacity is enhanced and equivalent series resistance can be decreased, so that a large current may be taken out in a short time.

Similarly, whether winding type or laminate type, by connecting a plurality in parallel, the equivalent series resistance can be decreased, so that a large current may be taken out in a short time.

Incidentally, according to the Standard Dictionary of Chemical Terms edited by Japan Society of Chemistry (Maruzen, 1991), latex is "formerly defined to be a natural rubber latex, but ever since development of synthetic rubber and synthetic resin emulsion other than rubber compound, all of them are collectively called latex." That is, in this invention, the latex is not limited to natural rubber and synthetic rubber alone, but includes emulsion of synthetic resin, and such resin scatters among particles of activated carbon, acetylene black, Ketienblack, and others, and they cause the particles to contact with each other. In the invention, the emulsion is, according to the same Standard Dictionary of Chemical Terms, "a system of dispersion of other hardly soluble liquid fine particles in a liquid solute," but aside from liquid fine particles, it may be also tacky or elastic gel fine particles. The solvent may be oil, but considering the environmental problems and working efficiency, water or the like is preferred. Dissolving is, according to same Standard Dictionary of Chemical Terms, "a phenomenon of melting of a substance in liquid to be a uniform liquid phase," and in the resin material dissolved in the conventional solvent, the product characteristic may be lowered in order to cover the surface of fine particles of activated carbon or the like (and also fine pores on the surface). However, if the emulsion or latex in the invention is dispersed in the electrode solution, it is predicted to scatter in the finished current collector 7, and therefore it is low in possibility of clogging of the activated fine pores with activated carbon.

Embodiment 20

In embodiment 20, it was attempted to increase the thickness of the current collector. In the case of a thick current collector, the problem is occurrence of breakage or crack when winding. FIG. 2 shows an example of method of evaluation of winding performance. In FIG. 2, reference numeral 9 is a round bar, and around the round bar 9, the conductive foil 2 cut in a product width and binding the current collector 3 at least on one surface is wound, and the winding performance of the current collector 3 is evaluated. In FIG. 2 (A), the current collector 3 is peeled off the conductive foil 2, and further the current collector 3 itself forms a fracture 10, and this state corresponds to evaluation of x (winding disabled). In FIG. 2 (B), the current collector 3 is not peeled off the conductive foil 2, and fine cracks 11 are formed on the surface of the current collector 3, and this state corresponds to evaluation of Δ (inferior in winding performance). In FIG. 2 (C), the conductive film 2 is not peeled off the current collector 3, and the surface of the current collector 3 is without fracture 10, cracks 11 or other damage, and this state corresponds to evaluation of o (excellent in winding performance). This performance was evaluated 10 times/100 times each alternately on both sides by forming the current collector 7 on both sides of the conductive foil 6.

Figure 5:
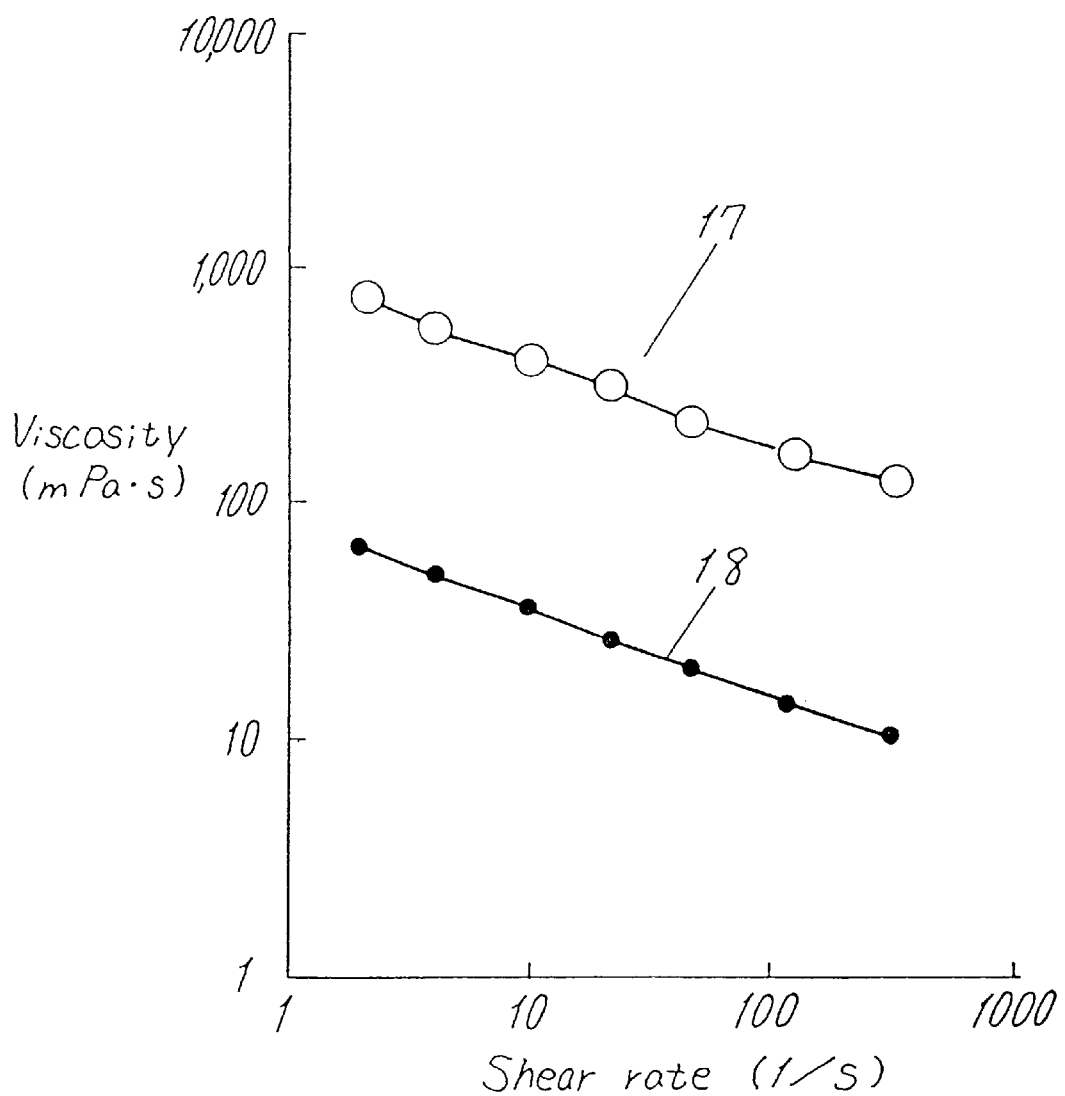
FIG. 5 is a characteristic diagram showing an example of viscosity changes by logarithm.

A further detail is described below. In purified water, low softening point resin was dissolved, and activated carbon powder, and acetylene black as conductive agent were added, and stirred sufficiently, and an electrode solution was prepared. This electrode solution was dispersed several times by using a high pressure dispersion machine as shown in FIG. 4. Same as in embodiment 1, by high pressure dispersion of the electrode solution, the viscosity was substantially lowered. The prepared electrode solution (corresponding to 18 in FIG. 5) was filtered, and applied directly on the conductive foil in a dry thickness of 500 Microns on each side (hereinafter called invention 10).

By way of comparison, the electrode solution before passing through the high pressure dispersion machine (corresponding to 17 in FIG. 5) was filtered, and directly applied on the conductive foil in a dry thickness of 500 micron on each side (hereinafter called prior art 11). These current collectors were evaluated as shown in FIG. 2. As a result, all samples of invention 10 were evaluated as (C). In prior art 11, on the other hand, the evaluation was (A) or (B), while (C) was not obtained. As a result of observation of the section of each current collector by SEM (scanning electron microscope), as compared with invention 10, prior art 11 was characterized by uneven density (and coarseness) inside the coat film of the current collector, which was estimated to be a main cause of difference in winding performance. By winding thus prepared invention 10, a winding 9 was completed, and an electric double layer capacitor as shown in FIG. 1 was fabricated. In prior art 11, however, the coat film was broken when winding, and winding 5a could not be formed. As a result, an electric double layer capacitor could not be obtained.

As a low softening point resin, a resin of which Tg (glass transition temperature) is −10 deg. C. or less is desired. The resin of which Tg is −10 deg. C. or more is stiff at room temperature, and breakage, peeling or fine crack may be formed when a current collector is formed. Such low softening point resins include many resins that can be polymerized or crosslinked, and by selecting such resins, the product reliability is enhanced. As the low softening point resin of which Tg (glass transition temperature) is −10 deg. C. or less, a resin containing plasticizer may be used, and such examples include vinyl chloride, ethylene-vinyl chloride copolymer resin, vinylidene chloride latex, chlorinated resin, vinyl acetate resin, polyvinyl butyral, polyvinyl formal, bisphenol system epoxy resin, polyurethane resin and others. Moreover, SBR (styrene-butadiene rubber), butadiene-rubber, isoprene rubber, NBR (acrylonitrile-butadiene copolymer rubber), urethane rubber, silicone rubber, acrylic rubber, and various elastomers may be used. By processing such resins to be soluble in water, or fine granular (latex), working efficiency and safety of electrode solution in high pressure dispersion may be enhanced.

Embodiment 21

FIG. 4 is a conceptual diagram of a high pressure dispersion machine. In FIG. 4, the electrode solution charged from an inlet 13 is pressurized to a pressure over 100 kg/cm² in a pressure unit 14, dispersed under pressure in a dispersion mixer 15, and discharged from an outlet 16. This electrode solution is applied on a conductive foil, and a current collector is formed. FIG. 1 shows a structural diagram of a winding type electric double layer capacitor fabricated by using this current collector. In FIG. 1, activated carbon and conductive agent are bound on the surface of a conductive foil 2 by a binder resin as a current collector 3 in a case 1. A plurality of conductive foils 2 forming this current collector 3 are wound on a separator 4, and a winding 5a is formed. A plurality of lead-out electrodes 6 are connected to the plurality of conductive foils 6 forming this winding 5a, and connected to a terminal 8 through a sealing material 7. In an actual electric double layer capacitor, a winding 9 is sealed in the case 1 together with an electrolyte solution.

A further detail is described below. In purified water, carboxy methyl cellulose resin was dissolved, and activated carbon powder and acetylene black as conductive agent were added, and stirred sufficiently, and an electrode solution was obtained. This electrode solution was dispersed several times by using the high pressure dispersion machine shown in FIG. 4. As a result, the viscosity of the electrode solution was notably lowered. FIG. 4 shows an example of changes of viscosity in a logarithmic graph. Reference numeral 17 shows the viscosity of the electrode solution before treatment of high pressure dispersion, and 18 shows the viscosity of the electrode solution after treatment of high pressure dispersion. Thus, by high pressure dispersion treatment, the viscosity of the electrode solution can be substantially decreased. The electrode solution thus prepared (corresponding to 14 in FIG. 3) was filtered, and directly applied on the conductive film in a dry thickness of 50 microns on each side. Finally, by assembling as shown in FIG. 2, and injecting specified electrolyte solution, a product was fabricated (hereinafter called invention 11).

By way of comparison, the electrode solution before passing through the high pressure dispersion machine (corresponding to p13 in FIG. 3) was filtered and directly applied on the conductive foil in a dry thickness of 50 microns on each side. Finally, by assembling as shown in FIG. 2, and injecting specified electrolyte solution, a product was obtained (hereinafter called prior art 12). As a result of measurement of electric characteristics of thus prepared samples, the capacity was more than 50% higher in invention 11 as compared with prior art 12. Moreover, as compared with the prior art, invention 11 was lowered to half or less in the impedance (and equivalent series resistance). Thus, by high pressure dispersion, the capacity and impedance were notably improved. Also as a result of evaluation of reliability of these samples, no problem was found.

To see why the characteristics are so different between the samples manufactured from the same materials, the samples were disassembled and investigated. As a result of measurement of density of each current collector, it was 0.30 g/cc in prior art 12, and 0.45 g/cc in the invention. It was thus found that the activated carbon and conductive agent were more intensified in density by high pressure dispersion.

Embodiment 22

Embodiment 22 explains the mode of preparing a specified electrode solution (and specified current collector coat film) by using high pressure dispersion machine, without adding alcohol, ammonia or the like. Thus, by using only purified water (or ion exchange water) as the solvent, exhaust of organic solvent from the coating machine is eliminated, and the product can be manufactured while taking the environments into consideration. It was further dispersed by using the high pressure dispersion machine shown in FIG. 2. FIG. 2 shows a conceptual diagram of the high pressure dispersion machine. In FIG. 2, the electrode solution charged from the inlet 10 is pressurized to a pressure over 100 kg/cm$^2$ in the pressure unit 11, and is dispersed at high pressure in the dispersion mixer 12, and is discharge from the outlet 13. Such dispersion is repeated a plurality of times depending on the necessity.

First, in the procedure shown in embodiment 1, without adding alcohol, ammonia or the like, in a resin solution composed of polytetrafluoroethylene resin in emulsion state dispersed in water in a particle size of 1 micron or less, activated carbon and conductive agent were dispersed, and a specified electrode solution was prepared. As a result of applying this electrode solution in a specified thickness as current collector, the density was 0.30 to 0.35 g/cc, and the surface was rough with multiple aggregates left over. As a result of analysis of these aggregates, the fracture was white and the aggregates were known to be polytetrafluoroethylene resin. It is thus known that polytetrafluoroethylene resin is likely to be aggregated. Concerning this electrode solution, by devising the method of dispersion, the dispersion of polytetrafluoroethylene resin was enhanced, and a current collector of high density and smooth surface was formed. This electrode solution was dispersed repeatedly a plurality of times by using the dispersion machine in FIG. 3. As a result, the viscosity of the electrode solution was less than half, and when measured by using a particle size distribution meter, it was found to be dispersed very highly. Using this electrode solution, as a result of application on the conductive foil in a specified thickness, the density was 0.40 to 0.70 g/cc, and the surface was very smooth and glossy. Assembling each sample into product, the capacity and impedance were measured, and the capacity was higher by 50% or more and the impedance was lowered by 30% in the samples of high pressure dispersion as compared with the control samples.

Thus, in spite of the same composition of electrode solution, by using such high pressure dispersion machine, a large effect was noted also in the electrode solution inferior in dispersion performance.

As such high pressure dispersion machine, various products are available commercially, but most applications are used in re-dispersion of milk or preparation of various emulsions, and no example is known in the application of preparation of electrode solution. The high pressure dispersion machine for use in preparation of electrode solution is preferred to comprise at least a pressurizing unit for pressurizing the electrode solution to a pressure of 100 kg/cm$^2$, and a dispersion mixer made of diamond, ceramic or cemented carbide. By using such hard material in members of the high pressure dispersion machine as required, the maintenance of the equipment is easy, and stability of product and reduction of cost are realized.

INDUSTRIAL APPLICABILITY

Thus, by employing the manufacturing method of electric double layer capacitor of the invention, the flexibility, thick coating performance and winding performance of the current collector are improved, and the capacity and density of the current collector can be notably enhanced, and the problems of the electric double layer capacitor about larger size, larger capacity and lower cost can be solved.

REFERENCE NUMERALS

1 Case
2 Conductive box
3 Current collector
4 Separator
5 Winding
5a Laminate
6 Lead-out electrode
7 Sealing material
8 Terminal
9 Round bar
10 Fracture 11 Fine crack
12 Normal surface
13 Inlet
14 Pressure unit
15 Dispersion mixer
16 Outlet

What is claimed is:

1. An electric double layer capacitor wherein a current collector composed of activated carbon, conductive agent, at least one kind of ammonium salt of carboxyl methyl cellulose resin, polyvinyl alcohol, methyl cellulose and hydroxy propyl cellulose resin, and polytetrafluoroethylene resin dispersed together is formed on at least one plane of a conductive foil at a density in the range of 0.35 g/cc to 1.50 g/cc, and a plurality of said conductive foils are wound or laminated on a separator, and sealed in a nonaqueous electrode solution together with lead-out electrodes.

2. An electric double layer capacitor wherein a current collector composed of activated carbon, conductive agent, at least one kind of ammonium salt of carboxyl methyl cellulose resin, polyvinyl alcohol, methyl cellulose and hydroxy propyl cellulose resin, and latex resin dispersed together is formed on at least one plane of a conductive foil at a density in the range of 0.35 g/cc to 1.50 g/cc, and a plurality of said conductive foils are wound or laminated on a separator, and sealed in a nonaqueous electrode solution together with lead-out electrodes.

3. An electric double layer capacitor wherein a current collector composed of activated carbon, conductive agent, at least one kind of ammonium salt of carboxyl methyl cellulose resin, polyvinyl alcohol, methyl cellulose and hydroxy propyl cellulose resin, and low softening point resin dispersed together is formed on at least one plane of a conductive foil at a density in the range of 0.35 g/cc to 1.50 g/cc, and a plurality of said conductive foils are wound or laminated on a separator, and sealed in a nonaqueous electrode solution together with lead-out electrodes.

4. An electric double layer capacitor wherein a current collector composed of activated carbon, conductive agent, and at least one resin or more of ammonium salt of carboxyl methyl cellulose resin, polyvinyl alcohol, methyl cellulose, hydroxy propyl cellulose resin, low softening point resin, polytetrafluoroethylene resin and latex dispersed together is formed on at least one plane of a conductive foil at a density in the range of 0.35 g/cc to 1.50 g/cc, zirconia or zirconia oxide is contained in said current collector by 1 part by weight to 10 parts by weight in 100 parts by weight of the resin, and a plurality of said conductive foils are wound or laminated on a separator, and sealed in a nonaqueous electrode solution together with lead-out electrodes.

5. A manufacturing method of electric double layer capacitor comprising:

preparing an electrode solution by dispersing activated carbon and conductive agent, in a resin solution composed of an aqueous solution of at least one resin of carboxyl methyl cellulose resin, polyvinyl alcohol, methyl cellulose, hydroxy propyl cellulose resin and latex, and polytetrafluoroethylene resin in emulsion state dispersed in water in a particle size of 1 micron or less, dispersing at pressure of more than 100 kg/cm$^2$ by using a high pressure dispersion machine, applying said electrode solution on a conductive foil in a specified thickness, and drying to prepare a current collector, winding or laminating said current collector on a separator, and sealing in a nonaqueous electrode solution together with lead-out electrodes.

6. A manufacturing method of electric double layer capacitor comprising:

preparing an electrode solution by dispersing a binder resin, in purified water or ion exchange water, together with activated carbon and conductive agent, at a pressure of more than 100 kg/cm$^2$ by using a high pressure dispersion machine, applying said electrode solution on a conductive foil as a coat film, and drying to prepare a current collector, winding or laminating said current collector on a separator, and sealing in a nonaqueous electrode solution together with lead-out electrodes.

7. A manufacturing method of electric double layer capacitor comprising:

dissolving or dispersing at least one resin of carboxyl methyl cellulose resin, polyvinyl alcohol, methyl cellulose and hydroxy propyl cellulose, in water, together with fine particles of latex or polytetrafluoroethylene resin, then, adding activated carbon and conductive agent, then, dispersing by using a high pressure dispersion machine, applying said electrode solution on a conductive foil in a specified thickness, and drying to prepare a current collector, winding said current collector on a separator, and sealing in a nonaqueous electrode solution together with lead-out electrodes.

8. An electric double layer capacitor comprising:

(a) a conductor having planes;

(b) a current collector installed at least on one of said planes of said conductor, said current collector including:

(1) an activated carbon, (2) a conductive agent, and (3) a water-soluble high polymer material and (4) at least one resin selected from the group consisting of fluoroplastic, latex resin, low softening point resin, and crosslinking resin, and said conductor having said current collector being at least one of a wound shape and a laminated shape through a separator;

(c) a nonaqueous electrode solution in which said conductor having said current collector is immersed; and (d) an electrode connected to said conductor.

9. An electric double layer capacitor of claim 8, wherein said current collector has a density in a range from about 0.35 g/cc to about 1.50 g/cc.

10. An electric double layer capacitor of claim 8, wherein said water-soluble high polymer material includes at least one material selected from the group consisting of ammonium salt of carboxy methyl cellulose resin, polyvinyl alcohol, methyl cellulose, and hydroxy propyl cellulose resin.

11. An electric double layer capacitor of claim 8, wherein said current collector is installed on both sides of said conductor.

12. An electric double layer capacitor of claim 8, wherein said conductive agent is at least one selected from the group consisting of acetylene black, Ketienblack, graphite powder, metal powder, and conductive high polymer material.

13. An electric double layer capacitor of claim 8,
wherein said one resin is said latex resin,
said latex resin is at least one selected from the group consisting of natural latex, styrene-butadiene rubber, nitrile-butadiene rubber, butadiene copolymer, styrene-butadiene copolymer, and carboxy denatured styrene-butadiene copolymer, and
said activated carbon, said conductive agent, and said latex resin are dispersed in said water-soluble high polymer material.

14. An electric double layer capacitor of claim 8,
wherein said one resin is said low softening point resin, and
said low softening point resin has a glass transition temperature of −10 deg. C. or less.

15. An electric double layer capacitor of claim 8,
wherein said one resin is said low softening point resin,
said low softening point resin is at least one selected from the group consisting of vinyl chloride, ethylene-vinyl chloride copolymer resin, vinylidene chloride latex, chlorinated resin, vinyl acetate resin, polyvinyl butyral, polyvinyl formal, bisphenol system epoxy resin, polyurethane resin, styrenebutadiene rubber, butadiene rubber, isoprene rubber, nitrile-butadiene rubber, urethane rubber, silicone rubber and acrylic rubber, and
said activated carbon, said conductive agent, and said low softening point resin are dispersed in said water-soluble high polymer material.

16. An electric double layer capacitor of claim 8,
wherein said at least one resin includes said crosslinking resin,
wherein said crosslinking resin is chemically crosslinked.

17. An electric double layer capacitor of claim 8,
wherein said current collector has a thickness in a range from about 20 microns to about 10 mm.

18. An electric double layer capacitor of claim 8,
wherein said conductor and said current collector installed on said surface of said conductor are wound in a winding diameter of about 5 mm or less.

19. An electric double layer capacitor of claim 8,
wherein said conductor and said current collector installed on one of said planes of said conductor have a plurality of current collectors, and
each current collector of said plurality of current collectors is laminated through said separator.

20. An electric double layer capacitor having a plurality of the electric double layer capacitors of claim 8,
wherein said each electric double layer capacitor is connected in series.

21. An electric double layer capacitor having a plurality of the electric double layer capacitors of claim 8,
wherein said each electric double layer capacitor is connected in parallel.

22. An electric double layer capacitor of claim 8,
wherein the total of said water-soluble high polymer material and said one resin is in a range from about 1 part by weight to about 200 parts by weight, in 100 parts by weight of said activated carbon.

23. An electric double layer capacitor comprising:
(a) a conductor having planes;
(b) a current collector installed at least on one of said planes of said conductor, said current collector including:
(1) an activated carbon,
(2) a conductive agent, and
(3) a water-soluble high polymer material and
(4) at least one resin selected from the group consisting of fluoroplastic, latex resin, low softening point resin, and crosslinking resin, and
said conductor having said current collector being at least one of a wound shape and a laminated shape through a separator;
(c) a nonaqueous electrode solution in which said conductor having said current collector is immersed; and
(d) an electrode connected to said conductor,
wherein said one resin is fluoroplastic,
said fluoroplastic is polytetrafluoroethylene resin, and
said activated carbon, said conductive agent and said polytetrafluoroethylene resin are dispersed in said water-soluble high polymer material.

24. A manufacturing method of electric double layer capacitor comprising the steps of:
(a) preparing an electrode solution by uniformly mixing a mixture including activated carbon, water-soluble high polymer material, and at least one resin selected from the group consisting of fluoroplastic, latex resin, low softening point resin, and crosslinking resin;
(b) applying said electrode solution on a conductor, and drying to form a current collector;
(c) forming at least one shape of winding shape and laminating shape said conductor having said current collector through a separator; and
(d) installing said conductor having said current collector in a nonaqueous electrode solution,
wherein said one resin is said fluoroplastic, and
said fluoroplastic has particles with a particle size of about 1 micron or less, being in an emulsion state dispersed in water.

25. A manufacturing method of electric double layer capacitor comprising the steps of:
(a) preparing an electrode solution by uniformly mixing a mixture including activated carbon, water-soluble high polymer material, and at least one resin selected from the group consisting of fluoroplastic, latex resin, low softening point resin, and crosslinking resin;
(b) applying said electrode solution on a conductor, and drying to form a current collector;
(c) forming at least one shape of winding shape and laminating shape said conductor having said current collector through a separator; and
(d) installing said conductor having said current collector in a nonaqueous electrode solution.

26. A manufacturing method of electric double layer capacitor of claim 25,
wherein said water-soluble high polymer material is at least one material selected from the group consisting of ammonium salt of carboxy methyl cellulose resin, polyvinyl alcohol, methyl cellulose and hydroxy propyl cellulose resin.

27. A manufacturing method of electric double layer capacitor of claim 25,
wherein said one resin includes said latex, and
said latex has particles with a particle size of about 1 micron or less, being in an emulsion state dispersed in water.

28. A manufacturing method of electric double layer capacitor of claim 24 or 27,
wherein said emulsion has a surface active agent, with the pH ranging from about 4 to about 12, and
at said step (a), said mixture is mixed while applying a pressure of 100 kg/cm² or more, so that said uniformly dispersed electrode solution is prepared.

29. A manufacturing method of electric double layer capacitor of claim 25,
wherein said one resin includes said latex, and said latex has particles with a particle size of about 1 micron or less, being in an emulsion state dispersed in water not containing at least one of ammonia and alcohol.

30. A manufacturing method of electric double layer capacitor of claim 25,
wherein said electrode solution has a viscosity in a range from about 1 poise to about 200 poise, and
at said step (b), said electrode solution is applied on a first surface of said conductor at a thickness precision from −10 microns to +10 microns at about 20 microns or more,
then, in a half-dry state until said applied electrode solution is not dried completely, said conductor coated with said electrode solution is wound,
then, said electrode solution is applied on a second surface of said conductor at a thickness precision from −10 microns to +10 microns at about 20 microns or more,
then, said electrode solution applied on said first surface and said second surface are dried simultaneously, and
then, said conductor having said electrode solution installed on said first surface and said second surface is wound again.

31. A manufacturing method of electric double layer capacitor of claim 25,
wherein at said step (a), said mixture is mixed while applying a pressure of 100 kg/cm² or more, so that said uniformly dispersed electrode solution is prepared.

32. A manufacturing method of electric double layer capacitor of claim 25,
wherein at said step (a), said mixture is mixed by using a dispersion machine having at least one mixing unit made of at least one material selected from the group consisting of diamond, ceramic and cemented carbide, so that said uniformly dispersed electrode solution is prepared.

33. A manufacturing method of electric double layer capacitor of claim 25,
wherein said one resin is said fluoroplastic,
said fluoroplastic has particles with a particle size of about 1 micron or less, being in an emulsion state dispersed in water, and
at said step (a), said mixture is mixed while applying a pressure of 100 kg/cm² or more, so that said uniformly dispersed electrode solution is prepared.

34. A manufacturing method of electric double layer capacitor of claim 25,
wherein said current collector has a density ranging from about 0.35 g/cc to about 1.50 g/cc.

35. A manufacturing method of electric double layer capacitor of claim 25,
wherein the total of said water-soluble high polymer material and said one resin is in a range from about 1 part by weight to about 200 parts by weight, in 100 parts by weight of said activated carbon.

36. A manufacturing method of electric double layer capacitor of claim 25,
wherein at said step (a), said mixture is mixed, together with at least one of purified water and ion exchange water, while applying a pressure of 100 kg/cm² or more, so that said uniformly dispersed electrode solution is prepared.

37. A manufacturing method of electric double layer capacitor of claim 25,
wherein at said step (a), said water-soluble resin and at least one resin of said fluoroplastic and said latex are mixed,
then, said activated carbon and said conductive agent are added to prepare said mixed solution,
then, said mixture is mixed while applying a pressure of 100 kg/cm² or more, so that said uniformly dispersed electrode solution is prepared.

38. A manufacturing method of electric double layer capacitor comprising the steps of:
(a) preparing an electrode solution by uniformly mixing a mixture including activated carbon, water-soluble high polymer material, and at least one resin selected from the group consisting of fluoroplastic, latex resin, low softening point resin, and crosslinking resin;
(b) applying said electrode solution on a conductor, and drying to form a current collector;
(c) forming at least one shape of winding shape and laminating shape said conductor having said current collector through a separator; and
(d) installing said conductor having said current collector in a nonaqueous electrode solution,
wherein said one resin is said fluoroplastic, and
said fluoroplastic has particles with a particle size of about 1 micron or less, being in an emulsion state dispersed in water,
wherein said emulsion has a surface active agent, with pH ranging from about 4 to about 12.

39. A manufacturing method of electric double layer capacitor comprising the steps of:
(a) preparing an electrode solution by uniformly mixing a mixture including activated carbon, water-soluble high polymer material, and at least one resin selected from the group consisting of fluoroplastic, latex resin, low softening point resin, and crosslinking resin;
(b) applying said electrode solution on a conductor and drying to form a current collector;
(c) forming at least one shape of winding shape and laminating shape said conductor having said current collector through a separator;
(d) installing said conductor having said current collector in a nonaqueous electrode solution, and
processing said current collector by at least one means of pressing and calendering to enhance at least one of characteristics of density and surface smoothness.

40. A manufacturing method of electric double layer capacitor comprising the steps of:
(a) preparing an electrode solution by uniformly mixing a mixture including activated carbon, water-soluble high polymer material, and at least one resin selected from the group consisting of fluoroplastic, latex resin, low softening point resin, and crosslinking resin;
(b) applying said electrode solution on a conductor, and drying to form a current collector;
(c) forming at least one shape of winding shape and laminating shape said conductor having said current collector through a separator; and (d) installing said conductor having said current collector in a nonaqueous electrode solution, wherein said one resin includes said fluoroplastic, said fluoroplastic has particles with a particle size of about 1 micron or less, being in an emulsion state dispersed in water, and said emulsion has the pH ranging from about 5 to about 12.

41. A manufacturing method of electric double layer capacitor comprising the steps of:

(a) preparing an electrode solution by uniformly mixing a mixture including activated carbon, water-soluble high polymer material, and at least one resin selected from the group consisting of fluoroplastic, latex resin, low softening point resin, and crosslinking resin;

(b) applying said electrode solution on a conductor, and drying to form a current collector;

(c) forming at least one shape of winding shape and laminating shape said conductor having said current collector through a separator; and (d) installing said conductor having said current collector in a nonaqueous electrode solution, wherein said electrode solution has a viscosity ranging from about 1 poise to about 200 poise, and said electrode solution is applied as to form said current collector in a thickness of about 20 microns or more, at thickness precision ranging from −5 microns to +5 microns.

42. An electric double layer capacitor comprising:

(a) a conductor having planes;

(b) a current collector installed at least on one of said planes of said conductor, said current collector including:
   (1) activated carbon,
   (2) conductive agent, and
   (3) at least one resin selected from the group consisting of water-soluble high polymer material, fluoroplastic, latex resin, low softening point resin, and crosslinking resin, and said conductor having said current collector being at least one of a wound shape and a laminated shape through a separator;

(c) a nonaqueous electrode solution in which said conductor having said current collector is immersed; and (d) an electrode connected to said conductor, wherein said crosslinking resin contains at least one catalyst of zirconia and zirconia compound, and said crosslinking resin is chemically crosslinked by the action of said catalyst.

43. A manufacturing method of electric double layer capacitor comprising the steps of:

(a) preparing an electrode solution by uniformly mixing a mixture including activated carbon, water-soluble high polymer material, and at least one resin selected from the group consisting of fluoroplastic, latex resin, low softening point resin, and crosslinking resin;

(b) applying said electrode solution on a conductor, and drying to form a current collector;

(c) forming at least one shape of winding shape and laminating shape said conductor having said current collector through a separator; and (d) installing said conductor having said current collector in a nonaqueous electrode solution, wherein said one resin includes said latex, and said latex has particles with a particle size of about 1 micron or less, being in an emulsion state dispersed in water, wherein said emulsion has a surface active agent, with pH ranging from about 4 to about 12.

44. An electric double layer capacitor comprising:

(a) a conductor having planes;

(b) a current collector installed at least on one of said planes of said conductor, said current collector including:
   (1) activated carbon,
   (2) conductive agent, and
   (3) at least one resin selected from the group consisting of water-soluble high polymer material, fluoroplastic, latex resin, low softening point resin, and crosslinking resin, and said conductor having said current collector being at least one of a wound shape and a laminated shape through a separator;

(c) a nonaqueous electrode solution in which said conductor having said current collector is immersed; and (d) an electrode connected to said conductor, wherein said current collector has a density in a range from about 0.35 g/cc to about 1.50 g/cc.

45. An electric double layer capacitor of claim 42, 43 or 44, wherein said water-soluble high polymer material includes at least one material selected from the group consisting of ammonium salt of carboxy methyl cellulose resin, polyvinyl alcohol, methyl cellulose, and hydroxy propyl cellulose resin.

46. An electric double layer capacitor of claim 42, 43 or 44, wherein said current collector is installed on both sides of said conductor.

47. An electric double layer capacitor of claim 42, 43 or 44, wherein said conductive agent is at least one selected from the group consisting of acetylene black, Ketienblack, graphite powder, metal powder, and conductive high polymer material.

48. An electric double layer capacitor of claim 42, 43 or 44, wherein said current collector has a thickness in a range from about 20 microns to about 10 mm.

49. An electric double layer capacitor of claim 42, 43 or 44, wherein said conductor and said current collector installed on said surface of said conductor are wound in a winding diameter of about 5 mm or less.

50. An electric double layer capacitor of claim 42, 43 or 44, wherein said conductor and said current collector installed on said surface of said conductor have a plurality of current collectors, and each current collector of said plurality of current collectors is laminated through said separator.

51. An electric double layer capacitor having a plurality of the electric double layer capacitors of claim 42, 43 or 44, wherein said each electric double layer capacitor is connected in series.

52. An electric double layer capacitor having a plurality of the electric double layer capacitors of claim 42, 43 or 44, wherein said each electric double layer capacitor is connected in parallel.

53. An electric double layer capacitor comprising:
(a) a conductor having planes;
(b) a current collector installed at least on one of said planes of said conductor, said current collector including:
   (1) activated carbon,
   (2) conductive agent, and
   (3) at least one resin selected from the group consisting of water-soluble high polymer material, fluoroplastic, latex resin, low softening point resin, and crosslinking resin, and said conductor having said current collector being at least one of a wound shape and a laminated shape through a separator;
(c) a nonaqueous electrode solution in which said conductor having said current collector is immersed; and
(d) an electrode connected to said conductor,
wherein said crosslinking resin is chemically crosslinked.

* * * * *